United States Patent [19]

Kawamura

[11] Patent Number: 4,577,203

[45] Date of Patent: Mar. 18, 1986

[54] INK JET RECORDING APPARATUS

[75] Inventor: Yoshikazu Kawamura, Shiojiri, Japan

[73] Assignees: Epson Corporation; Kabushiki Kaisha Suwa Seikosha, both of Tokyo, Japan

[21] Appl. No.: 763,324

[22] Filed: Aug. 7, 1985

Related U.S. Application Data

[63] Continuation of Ser. No. 425,767, Sep. 28, 1982, abandoned.

[30] Foreign Application Priority Data

Sep. 30, 1981 [JP] Japan ........ 56-155209
Aug. 13, 1982 [JP] Japan ........ 57-141297

[51] Int. Cl.⁴ ........ G01D 15/18

[52] U.S. Cl. ........ 346/140 R; 346/75

[58] Field of Search ........ 346/140 R, 75; 417/306, 417/417, 435, 503, 510, 565; 137/565.1, 565.2, 624.13, 625.48; 400/18, 19, 124, 568; 604/129, 8, 9, 122

[56] References Cited

U.S. PATENT DOCUMENTS

| | | | |
|---|---|---|---|
| D. 252,470 | 7/1979 | Pawlak | D24/54 X |
| 3,516,760 | 6/1970 | Dettinger | 417/503 |
| 3,787,882 | 1/1974 | Fillmore et al. | 346/75 |
| 3,805,276 | 4/1974 | Ishii | 346/140 R |
| 4,064,909 | 12/1977 | Neward | 137/625.48 |
| 4,085,837 | 4/1978 | Tararo et al. | 197/133 R X |
| 4,112,436 | 9/1978 | Cone | 346/140 R |
| 4,123,761 | 10/1978 | Kimura et al. | 346/140 R |
| 4,144,537 | 3/1979 | Kimura et al. | 346/140 R |
| 4,167,743 | 9/1979 | Corwin | 346/140 R |
| 4,321,607 | 3/1982 | Heibein et al. | 346/75 |
| 4,336,000 | 6/1982 | Jorgensen et al. | 417/53 X |
| 4,362,572 | 12/1982 | Wallace | 134/18 X |
| 4,380,770 | 4/1983 | Maruyama | 346/140 R |
| 4,383,263 | 5/1983 | Ozawa et al. | 346/140 R |
| 4,403,233 | 9/1983 | Terasawa | 346/140 R |
| 4,410,900 | 10/1983 | Terasawa | 346/140 R |
| 4,429,320 | 1/1984 | Hattori et al. | 346/140 R |

*Primary Examiner*—E. A. Goldberg
*Assistant Examiner*—Gerald E. Preston
*Attorney, Agent, or Firm*—Blum Kaplan Friedman Silberman & Beran

[57] ABSTRACT

An ink jet recording apparatus for projecting ink onto a recording medium. The apparatus includes an ink jet head adapted to receive ink having an ejection nozzle for ejecting ink towards said recording medium. An ink tank means stores ink and supplies the stored ink to the ink jet head. A switching mechanism selectively switches between a first condition where the ink tank is in fluid communication with the ink jet head and a second condition where the ink jet head is vented to atmosphere. A nozzle cap selectively covers the ejection nozzle. A suction mechanism creates a suction in the cap. The cap draws ink and air out of the ink jet head through the ejection nozzle to prevent clogging and remove air bubbles from the ink.

50 Claims, 24 Drawing Figures

FIG. 3A
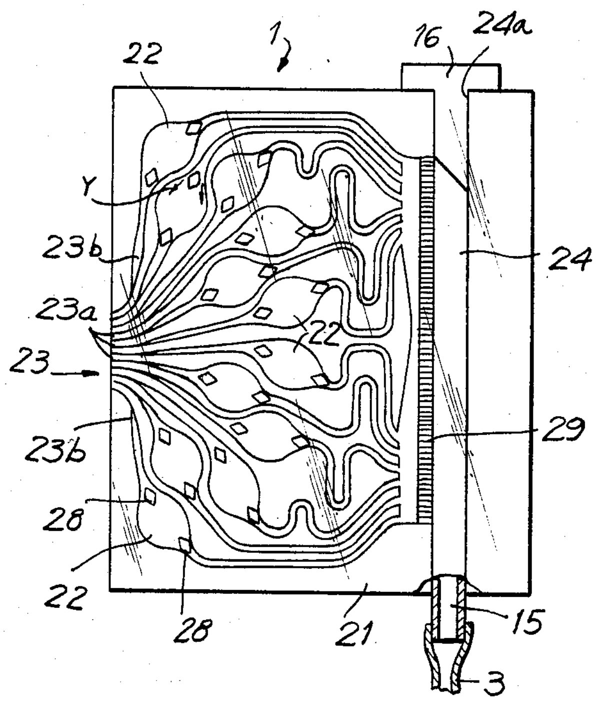
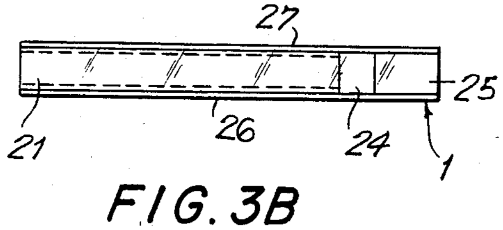
FIG. 3B

INK JET RECORDING APPARATUS

This is a continuation of application Ser. No. 425,767, filed Sept. 28, 1982, now abandoned.

BACKGROUND OF THE INVENTION

The present invention relates generally to an ink jet recording apparatus and, in particular, to an ink jet recording apparatus which ejects ink directly onto a recording medium for forming characters thereon and which prevents problems caused by air bubbles in the ink and clogging of the ink passages.

Many types and constructions of ink jet recording devices have been developed and utilized heretofore. One such ink jet recording apparatus which selectively ejects ink only on demand is described in Japanese Laid-Open Patent Publication No. 51-35231 and should receive attention because of the simplicity of its construction. The ink jet recording apparatus of this type has gone through many improvements and modifications, but has not been rendered practically feasible due to lack of reliability. Those devices which have been available for practical use suffer from limitations such as the ease of use, and have therefore proven unsatisfactory.

The difficulty arises because of the fact that no final solutions have been found to the problems caused by air bubbles in the ink and the problems caused by clogging of the ink passages. As can be understood from the principles of recording described in the aforementioned Japanese Publication No. 51-35231, no ink can properly be ejected when air bubbles are trapped in a pressurization chamber for pressurizing ink on the ink jet head. Ink passage clogging happens not only in the ink jet recording apparatus under consideration, but also in all forms of ink jet recording devices. However, this clogging problem is even more pronounced particularly with the ink jet recording apparatus of the ink-on-demand type as the ejection nozzle thereof has a relatively small cross section.

Various proposals to solve the problems encountered in ink jet recording will be described herein. There have been suggested many improved ways of removing air bubbles from the ink that tend to be included in the ink such as when the ink is initially loaded in the device or a cartridge of ink is replaced. Representative are a device for removing air bubbles through ink circulation such as is disclosed in Japanese Laid-Open Patent Publication Nos. 54-159227 and 54-160242, for example, and an air bubble remover disposed in a passage of the ink such as is described in Japanese Laid-Open Patent Publication No. 51-88224. Although means are disclosed in Japanese Patent Publication No. 53-20882 for removing air bubbles which are formed within ink due primarily to cavitation, substantially no consideration has been given to coping with such air bubbles when they remain in the ink. Attempts to prevent an ink passage in the apparatus from becoming clogged include providing improved ink compositions, providing a cover for an ejection nozzle in the ink jet head, and providing means for forcibly releasing the ink passage of clogging, for example, as described in Japanese Laid-Open Utility Model Publication No. 54-66853. However, these attempted arrangements have proven unsatisfactory for the reasons described hereinafter. Accordingly, an improved ink jet recording apparatus which is reliable in operation and which avoids the problems encountered in the prior art devices such as those caused by air bubbles and clogging is urgently desired.

SUMMARY OF THE INVENTION

Generally speaking, in accordance with the present invention, an ink jet recording apparatus which prevents the problems caused by air bubbles in the ink and clogging of the ink passages, is provided. The ink jet recording apparatus includes an ink jet head having an ink supply port through which ink is supplied to the head and an ejection nozzle for ejecting the ink onto a recording medium to form images thereon. The apparatus also includes an ink tank which stores the ink to be supplied to the head and a switching mechanism. A first ink conduit couples the ink supply port to the switching mechanism. A second ink conduit couples the switching mechanism to the ink tank. The switching mechanism is selectively actuatable to either selectively couple the first ink conduit to the second ink conduit or to vent the first ink conduit to atmosphere.

A suction cap is selectively engageable with the ejection nozzle. The apparatus also includes a drain tank which is coupled to the suction cap by a third conduit. A suction mechanism creates a suction in the third conduit so that when the suction cap is engaged with the ejection nozzle, a suction is created in the ejection nozzle and the first ink conduit. A control mechanism controls the operation of the switching mechanisn and the suction mechanism.

The suction cap and suction mechanism act to clear the ejection nozzle of air bubbles and to prevent clogging of the ink passages in order to provide an efficiently operating ink jet recording apparatus free of problems caused by air bubbles and clogging.

Accordingly, it is an object of the present invention to provide an improved ink jet recording apparatus.

Another object of the present invention is to provide an ink jet recording apparatus which overcomes the problems caused by air bubbles in the ink and clogging of the ink passages.

A further object of the present invention is to provide an ink jet recording apparatus which includes an ink suction cap which draws ink out of the ejection nozzle to remove air bubbles and to prevent clogging.

A still further object of the present invention is to provide an improved ink jet recording apparatus for use in printers which greatly improves the performance of the printer.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 3A and 3B are top plan and side elevational views, respectively, of an ink jet recording head constructed for use in the ink jet recording apparatus of the present invention;

DESCRIPTION OF THE PREFERRED EMBODIMENTS

In developing the present invention, various conditions in which to place an ink jet recording apparatus have been considered in an effort to solve the two major problems caused by air bubbles in ink and clogging of the ink passages. As a result, the present invention recognizes the conclusion that air bubbles formed in the ink and clogging of ink passages cannot be completely eliminated unless provision is made to deal with the difficulties hereinafter described. Air bubbles can be either introduced into ink from the exterior or formed in ink due to cavitation. It has been found that air bubbles formed by cavitation result from minute air bubbles in ink which form larger air bubbles. Cavitation normally takes place under a high negative pressure. Where there are minute air bubbles in ink, the threshold value of negative pressure beyond which cavitation occurs becomes quite low, and hence cavitation can easily be created under a small negative pressure developed immediately after ink is ejected out of the nozzle. Such a condition cannot be avoided, though it is subject to differences dependent on the size and shape of the recording head for ejecting ink onto a recording medium. The minute air bubbles are formed mainly from air, primarily oxygen and nitrogen, dissolved in ink.

Figure 1:
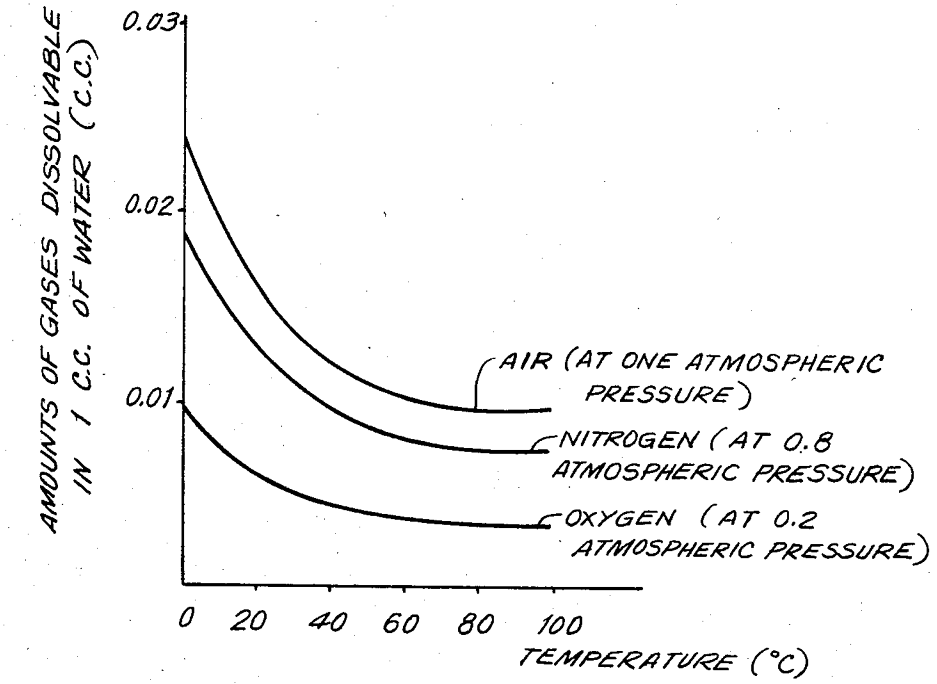
FIG. 1 is a graph depicting the relationship between amounts of several gases dissolvable in water as a function of temperature.

As shown in FIG. 1, 1.6% of air is dissolved in water (liquid) ink at 20 degrees Celsius. The solubility of air in ink becomes smaller the higher the temperature of the ink. Therefore, as the temperature goes higher during the recording operation, more air which has been dissolved in ink is formed as air bubbles in ink. The ink circulation as described above is effective to remove relatively large air bubbles, but is the cause of forming fine air bubbles when ink with air bubbles is circulated back into an ink tank. Mere vibration or movement of the ink tends to produce minute air bubbles in the ink. Although the device for removing air bubbles as described above can catch relatively large air bubbles, it is ineffective for fine air bubbles having a diameter of the order of a few microns. The arrangement for preventing cavitation as described in Japanese Patent Publication No. 53-20882 removes oxygen from ink, but allows nitrogen to remain dissolved in ink and to be formed into fine air bubbles upon temperature changes. As can be seen by the graph in FIG. 1, removal of only oxygen still leaves $\frac{4}{5}$ by volume of nitrogen in ink. Therefore, consideration should be given to the foregoing for stable recording irrespective of the conditions in which a recording apparatus is placed.

To prevent ink passages from getting clogged, improvements have been made toward volatile ink. However, the problem of incompatibility between easy volatility and quick drying of ink upon recording has not been fully solved. Furthermore, improved wet-type and dry-type covers for covering the front face of an ejection nozzle have been proposed, but are much less effective at high temperatures than at normal temperatures. An ink conduit for delivering ink into a recording head is made of high-polymer material due to required flexibility which allows free movement of the recording head. The best high-polymer material is a resin of vinylidene chloride, which, however, permits ink to evaporate through a wall of the ink conduit at high rates especially at high temperatures. Even with the nozzle designed to prevent evaporation of ink therefrom, such ink evaporation from the ink conduit eventually causes the ink passage to become clogged. Once the ink conduit or nozzle is clogged, it is difficult for the forcible releasing mechanism as disclosed in Japanese Laid-Open Utility Model Publication No. 54-66853 to completely remove solid particles out of the ink conduit or to fully restore the nozzle which is extremely thin. With solid material left in a portion of the nozzle, for example, the linearity of travel of ink droplets is lost. In addition, air which has passed through the wall of the ink conduit causes ink to become saturated, a condition which renders recording unstable during an initial period.

As described above, the prior improvements have been unsatisfactory. The present invention has been made in an effort to overcome all of the drawbacks and disadvantages of the conventional ink jet recording apparatus.

Figure 2:
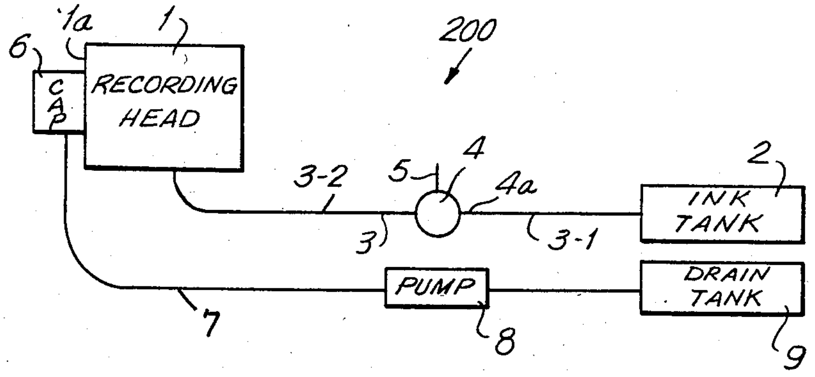
FIG. 2 is a schematic diagram depicting an ink jet recording apparatus constructed in accordance with a preferred embodiment of the present invention.
Figure 4A:
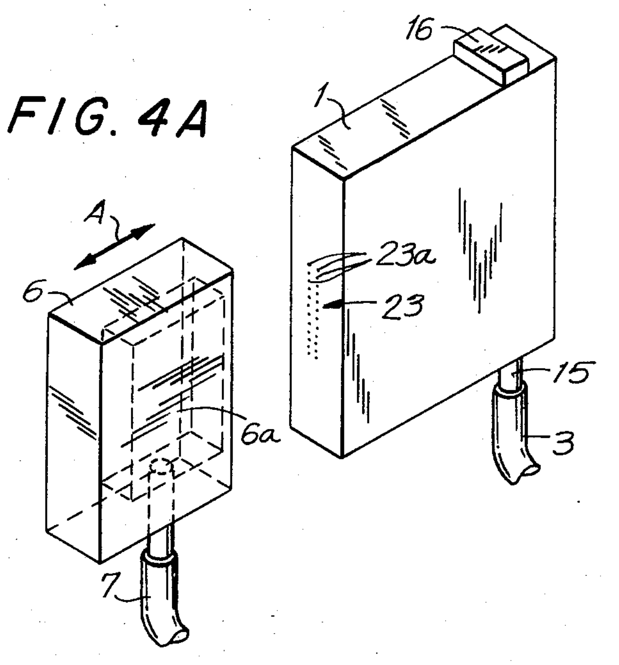
FIGS. 4A and 4B are perspective views of alternate embodiments of an ink suction cap and ink jet head constructed for use with the ink jet recording apparatus of the present invention.
Figure 4B:
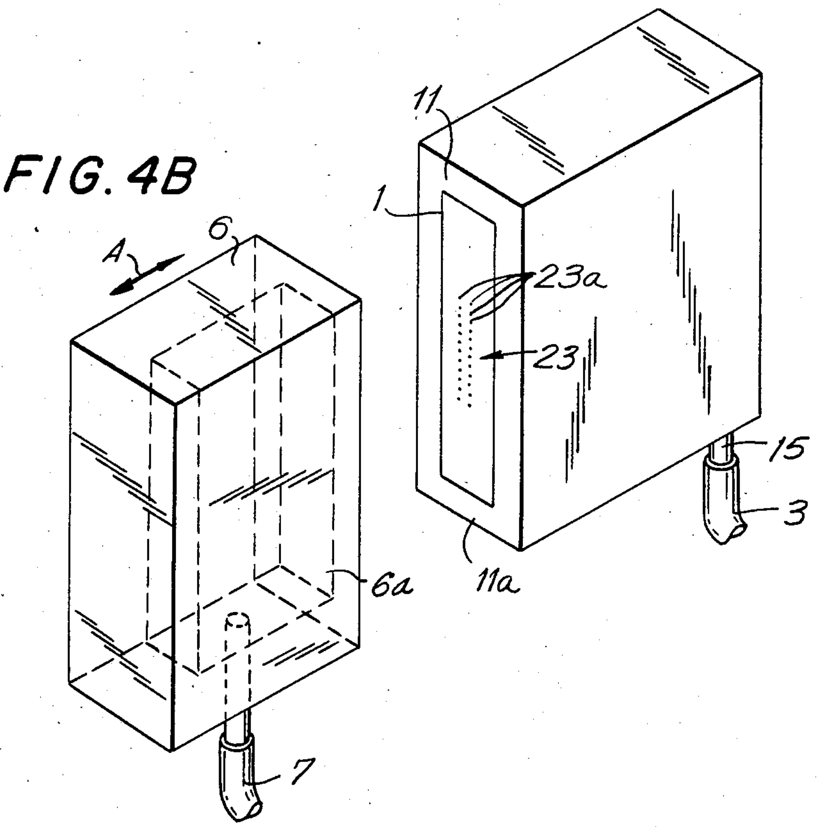
Figure 5:
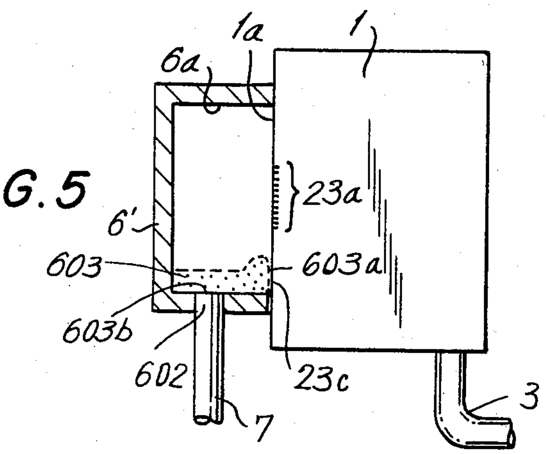
FIG. 5 is a side elevational view of an ink suction cap and ink jet head constructed according to another embodiment of the present invention.

FIG. 2 schematically depicts an ink jet recording apparatus, generally indicated at 200, constructed in accordance with a preferred embodiment of the present invention. Recording apparatus 200 includes an ink jet recording head 1, an ink tank 2 such as an ink cartridge, and an ink conduit 3 for delivering ink from ink tank 2 to recording head 1. A directional control valve 4 is disposed in ink conduit 3, and has a first port 5 vented to atmosphere and a second port 4*a* coupled to ink tank 2. An ink suction cap 6 is detachably coupleable to a front face 1*a* of recording head 1 and has a cavity 6*a* for covering a nozzle 23 on head 1 as depicted in FIGS. 4A, 4B and 5. Ink suction cap 6 is coupled through a conduit 7 and a pump 8 to a drain tank 9. Before describing the operation of recording apparatus 200 thus constructed, the construction of recording head 1 will first be described in detail.

Referring now to FIGS. 3A and 3B, recording head 1 comprises a substrate 21 of glass having on its opposing surfaces a plurality of pressurization chambers 22 and nozzle orifices 23*a* defined at the end of grooves 23*b* by etching, and an ink reservoir 24 having a relatively large volume for supplying ink from a pipe or conduit 15 to pressurization chambers 22. A piece of glass 25 having the same thickness as that of glass substrate 21 is positioned in juxtaposed relation to substrate 21. Substrate 21 and glass piece 25 are sandwiched at their opposing surfaces between a pair of glass plates 26 and 27 of which are relatively thin and serve as vibratory plates or flexible walls. Glass plates 26 and 27 are bonded to substrate 21 and glass piece 25 such as by fusion. Reservoir 24 is defined by a space which is formed jointly by glass substrate 21, glass piece 25, and glass plates 26 and 27. The spaced defined by reservoir 24 is therefore sufficiently large in volume as compared with grooves 23*b* having depths ranging from ten to few hundred microns.

A first end 24*a* of reservoir 24 is closed off by a plug 16. A filter unit 29 may be formed between reservoir 24 and pressurization chambers 22 by etching at the same time that pressurization chambers 22 are formed. Piezoelectric elements (not shown) are mounted on vibratory plates 26 and 27 over pressurization chambers 22 for selectively deforming vibratory plates 26 and 27 for changing the volume of pressurization chambers 22 for ejecting ink out of nozzle orifices 23*a* in response to electric pulses applied thereto. For better loading of ink, pressurization chambers 22 which are substantially circular in shape may have land-shaped projections 28 positioned at inlet and outlet ends thereof for causing ink to flow along the walls of chambers 22 in the directions indicated by arrows Y.

Reference is now made to FIGS. 4A and 4B. FIG. 4A depicts the way in which ink suction cap 6 is engageable with nozzle 23 of recording head 1. Ink suction cap 6 with the cavity 6*a* formed therein is movable in the directions indicated by arrow A. Ink suction cap 6 can be brought into intimate contact with nozzle 23 as desired to cover nozzle orifices 23*a*. Cavity 6*a* in ink suction cap 6 is in open communication with conduit 7. As shown in FIG. 4B, ink suction cap 6 with cavity 6*a* may be engageable closely with the front face 11*a* of a head cover 11 mounted on head 1 for protecting head 1.

FIG. 5 depicts an ink suction cap 6' according to another embodiment of the present invention. Identical parts in FIG. 5 are denoted by like reference numerals as used in FIGS. 4A and 4B. Ink suction cap 6' has a cavity 6*a* in which a porous moisture absorbent material 603 is situated, which is held in contact at an end 603*a* thereof with a portion 23*c* of nozzle face 1*a* of head 1 below nozzle orifices 23*a* when ink suction cap 6' is brought into intimate contact with nozzle face 1*a*. The porous moisture absorbent material 603 has a portion 603*b* covering a suction port 602 coupled to conduit 7. With this arrangement, an ink layer formed on nozzle face 1*a* can quickly be removed by being absorbed into the porous moisture absorbent material 603. The ink absorbed by porous moisture absorbent material 603 is discharged through conduit 7, so that porous moisture absorbent material 603 is kept refreshed at all times for continued absorption of ink from nozzle face 1*a*.

Since the porous moisture absorbent material 603 covers suction port 602, it also serves as a filter to prevent impurities such as dust in the ink from flowing into conduit 7. Therefore, no clogging takes place in the ink passage extending from conduit 7 to drain tank 9 depicted in FIG. 2.

Operation of the recording apparatus according to the present invention will be described with reference to FIGS. 2, 3A, 3B, 4A and 4B. When recording is to be started, or ink is initially to be loaded into recording head 1 or ink cartridge 2 is to be replaced, ink suction cap 6 is moved toward recording head 1 and brought into intimate contact therewith so that cavity 6*a* covers nozzle 23. Then, directional control valve 4 is switched to couple recording head 1 to ink tank 2 through conduit 3, and suction pump 8 is actuated. A vacuum is developed in cavity 6*a* through conduit 7 to draw ink from ink tank 2 through conduit 3 until ink reservoir 24, pressurization chambers 22, grooves 23*b* and nozzle orifices 23*a* in recording head 1 are filled with ink. For complete ink loading and removal of air bubbles, ink is drawn from ink tank 9 to nozzles 23 until a small amount of ink is drained from nozzles 23 into drain tank 90.

This process of drawing ink from ink tank 2 to recording head 1 by maintaining nozzle orifices 23*a* under vacuum condition is more advantageous than the process of pressurizing ink tank 2 to force ink out of nozzle 23 in that less ink remains in ink reservoir 24 and pressurization chambers 22, ink can be smoothly loaded, and air bubbles can be discharged efficiently. The amount of ink which is discharged from nozzle 23 is less than 1 c.c., and, hence, no appreciable amount of ink is wasted during the loading process.

After recording head 1 has been filled with ink, recording head 1 is moved by a carriage, as described in detail below, to a recording position to start the recording operation. When the recording operation is completed, recording head 1 returns to the position where ink suction cap 6 is located. Directional control valve 4 is then switched to vent ink conduit 3 to atmosphere through port 5. Pump 8 is actuated to draw air through ink conduit portion 3-2 into recording head 1. Ink in conduit 3-2 and recording head 1 is drained through ink suction cap 6, conduit 7, and pump 8 into drain tank 9, whereupon all ink has been removed from recording head 1 and conduit 3-2. Thus, ink is completely removed from recording head 1 by the foregoing operation. The recording head is free from clogging in whatever conditions it may be placed. There is no danger for small dust particles such as dye particles to deposit around nozzle orifices 23*a*. Therefore, ink droplets can be stably ejected out of nozzle 23.

Directional control valve 4 is disposed in ink conduit 3 through which ink tank 2 and recording head 1 are interconnected, thus dividing ink conduit 3 into conduit sections 3-1 and 3-2 as depicted in FIG. 2. Ink conduit 3-2 is preferably made of high-polymer material so as to be able to move flexibly in response to movement of recording head 1. Ink conduit 3-2 therefore allows ink to evaporate therefrom and air to pass thereinto. Directional control valve 4 as placed in conduit 3 permits for removal of ink also from the conduit 3-2 as well as from recording head 1. Conduit 3-1 may be made of metal such as stainless steel since it is stationary.

After ink has been discharged, the first ink conduit 3-2 is vented to atmosphere and the second ink conduit 3-1 is closed off by directional control valve 4. There is no possibility for second ink conduit 3-1 to allow evaporation therethrough of ink in conduit 3-1 and ink tank 2 and air is not introduced therein. Assuming that conduit 3-2 has an inside diameter of 1 mm and a length of 500 mm, the amount of ink consumed by conduit 3-2 upon such ink discharging operation is about 0.4 c.c., and the amount of ink consumed by recording head 1 including reservoir 24, pressurization chambers 22 and nozzle 23 is about 0.1 c.c. Hence, the total amount of consumed ink is about 0.5 c.c. The ink discharging operation is not wasteful of ink. When it is desired to start printing again, directional control valve 4 is switched to load ink into recording head 1 in the manner described above.

Clogging can be completely prevented by the foregoing ink discharging and loading operations. Air bubbles which have been trapped through nozzle 23 upon initial ink loading, replacement of the ink tank, and accidental shocks, can reliably be removed by the ink drawing operation described above.

Figure 6:
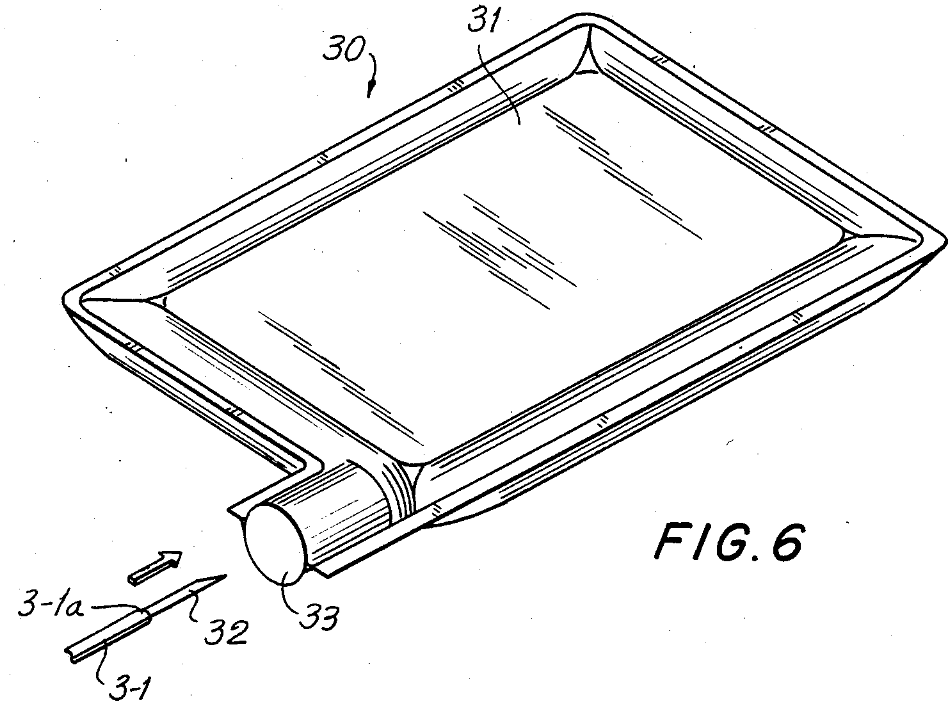
FIG. 6 is a perspective view of an ink tank and ink conduit constructed in accordance with an embodiment of the present invention.

Air that is dissolved in ink should be given another consideration. As described above, it is necessary to remove air completely from ink. To this end, ink needs to be fully deaerated, and it should be kept deaerated for a long period of time. Therefore, ink tank 2 shown in FIG. 2 should shield the ink from air. According to the present invention as depicted in FIG. 6, ink tank 2 includes an ink cartridge 30 composed of a bag 31 made of aluminum foil laminated with a high-polymer film such as of polyethlene or nylon, and a joint 33 such as of rubber to which a needle-shaped pipe 32 attached to a distal end 3-1*a* of conduit 3-1 is coupleable.

There has been known a conventional ink cartridge made of laminated films of a resin of vinylidene chloride which is generally known to have an extremely low evaporation coefficient of air permeability. The air permeability of the material, however, becomes increased at high temperatures. Theoretically, the air permeability P can be expressed by the equation $P=P_O\exp(-E/RT)$, where E=activation energy, T=absolute temperature and R=gas constant, which indicates temperature dependency of the air permeability. Stated otherwise, the higher the temperature, the larger the air permeability. As an example, a composite film of vinylidene chloride resin sold under the name "Saranex #26" by K. K. Asahi Dow and having a thickness of about 60 microns, is capable of transmitting therethrough oxygen by the amount of 7 c.c./$m^2$.24 hr. 1 atm at normal temperature. When the ink cartridge as shown in FIG. 6 is made of such a composite film and has a surface area of 200 $cm^2$, and 200 c.c. of water (liquid) ink is contained therein, the ink in the cartridge is fully saturated in about 40 days. At a high temperature (e.g. 65 degrees Celsius), the air permeability becomes up to ten times larger, and ink cannot keep for an extended period of time.

With the arrangement of the present invention, the ink cartridge is in the form of a bag of laminated aluminum foils each having a thickness of a few microns. Although the aluminum foil may comprise a deposited film of a few hundred Å for a reduced air permeability, it should preferably be composed of a thin film of a few microns to prevent formation of pin holes. With the aluminum foil of a few microns, the air permeability of the ink evaporation coefficient are substantially nil, allowing ink to be stored for a long period of time. Since the aluminum foil of a few microns in the form of a bag has an increased rigidity, it is necessary to prepare a flat closed bag having a relatively large surface area as illustrated in FIG. 6. More specifically, the bag needs to become progressively more flattened as the ink is consumed, and should not take a form which is freely deformable. According to the present invention, there is provided an ink cartridge or tank thus arranged in addition to the system for drawing and loading ink as described above.

Figure 7A:
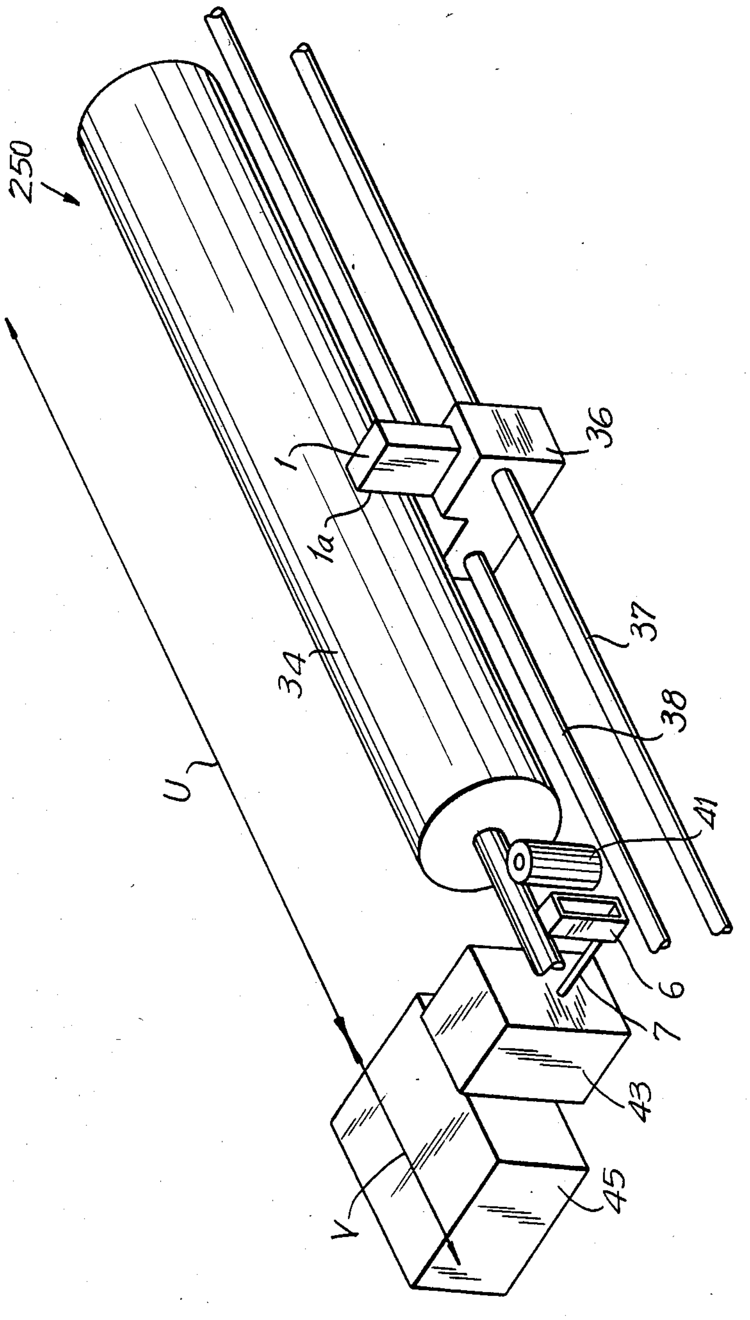
FIG. 7A is a perspective view of a serial printer in which the ink jet recording apparatus of the present invention has been incorporated.

FIG. 7A depicts an arrangement in which the recording apparatus of the foregoing construction is incorporated in a serial printer generally indicated at 250. Serial printer 250 comprises a rotatable platen 34, a carriage 36 supporting thereon recording head 1, and two guide shafts 37 and 38 along which carriage 36 is slidable by a motor or drive belt (not shown) in parallel relation to platen 34. With a recording sheet of paper pressed on platen 34, carriage 36 is driven along guide shafts 37 and 38 to effect printing on the recording sheet pressed on platen 34. Recording head 1 has preferably 24 nozzle orifices to record characters and picture images with 24 dots for each printing position.

Carriage 36 is movable with respect to platen 34 in confronting relation thereto for a distance indicated by arrow U which is referred to as a recording position, and recording head 1 is movable to a home position indicated by arrow V in which ink is loaded into recording head 1 and ink is drawn from recording head 1. Various devices are located at home position V to carry out the ink loading and drawing operations. When paper particles or other foreign matter are deposited on nozzle surface 1*a*, head 1 is brought into the home position V in alignment with a roller brush 41 located in home position V. Brush 41 is then rotated to remove dust off nozzle surface 1*a* of head 1.

Ink suction cap 6 as shown is movable into and out of engagement with head 1 which is held in alignment with ink suction cap 6. An ink supply system 43 which is disposed in home position V includes directional control valve 4 and pump 8 as shown in FIG. 2, and a control mechanism for actuating valve 4 and pump 8. The construction of ink supply system 43 will be described in detail below. Ink suction cap 6 and ink supply system 43 are interconnected by a conduit 7 for drawing ink or air from recording head 1. As can be understood from FIG. 2, conduit 7 is connected to a pump in ink suppy system 43. An ink tank system 45 contains ink tank 2 and drain tank 9 (FIG. 2) which are assembled together. From ink tank system 45, there extend conduits to directional control valve 4 and pump 8 in ink supply system 43 as shown in FIG. 2. Ink supply system 43 is connected by a flexible conduit 3-2 to recording head 1.

Operation of serial printer 250 thus constructed is as follows. While serial printer 250 is at rest, carriage 36 is in home position V with nozzle surface 1*a* of recording head 1 being covered by ink suction cap 6, and ink is removed from recording head 1 in the manner described above. When the power supply for the serial printer is turned on, ink supply system 43 is actuated to load ink into the recording head 1 in the manner described above. Upon supply of a printing command, carriage 36 is moved to the printing position U and effects printing according to the content of the printing command signals. When the power supply for serial printer 250 is turned off, carriage 6 is moved back to home position V, and the nozzle surface 1*a* of recording head 1 is covered by ink suction cap 6. Ink can then be withdrawn from recording head 1 as described in detail above.

The amount of ink consumed in one cycle of ink drawing and loading operations is about 1 to 2 c.c., which is not appreciable if ink is drained only in one cycle a day. However, when the power supply is turned on and off frequently in a day, the amount of ink consumption cannot be negligible. According to the present invention, conditions which could lead to clogging of the nozzles with ink are studied, and there is employed a system for drawing ink out only when a danger for causing clogging is imminent. Operation of such a system will be described hereinbelow in detail. Briefly summarized, the system is actuated to unload ink when (1) a certain period of time has elapsed after the power supply for the printer has been switched off or printing operation has been completed, (2) the printer is subjected to a temperature higher than a certain level, and/or (3) the printer is subject to a temperature lower than a certain level. The condition (1) is required since when left unused for a prolonged period of time, water evaporates from ink, which then tends to clog the nozzles. The period of time after which the system should be actuated may range from one day to one week with a safety margin. For example, where the printer is operated every day, no ink loss is caused if the period of time is selected to be one day, and such a one-day safety period poses no problem in practice. Although ink is subjected to a small rate of evaporation at normal temperatures due to wetting in the ink, the ink will evaporate at an accelerated rate at high temperatures. Under the condition (2), ink is drained off recording head 1 at a temperature over 50 or 60 degrees Celsius. The condition (3) is necessary because when the printer is at a temperature below the freezing point of ink, ink filled in the ink head and other conduits is liable to damage the ink head and the conduits. Therefore, when there is a danger for the printer to undergo a temperature lower than the ink freezing point, the ink is drained to keep the printer protected against damage.

In order to carry out the foregoing operations with reliability, carriage 36 should be placed at a predetermined location in home position V. To detect arrival carriage of 36 at home position V, a position sensor is required which may comprise a commercially available reed switch or a switch incorporating a photodetector, for example. In addition, other devices such as a timer and a temperature sensor are required as described hereinafter.

Figure 7B:
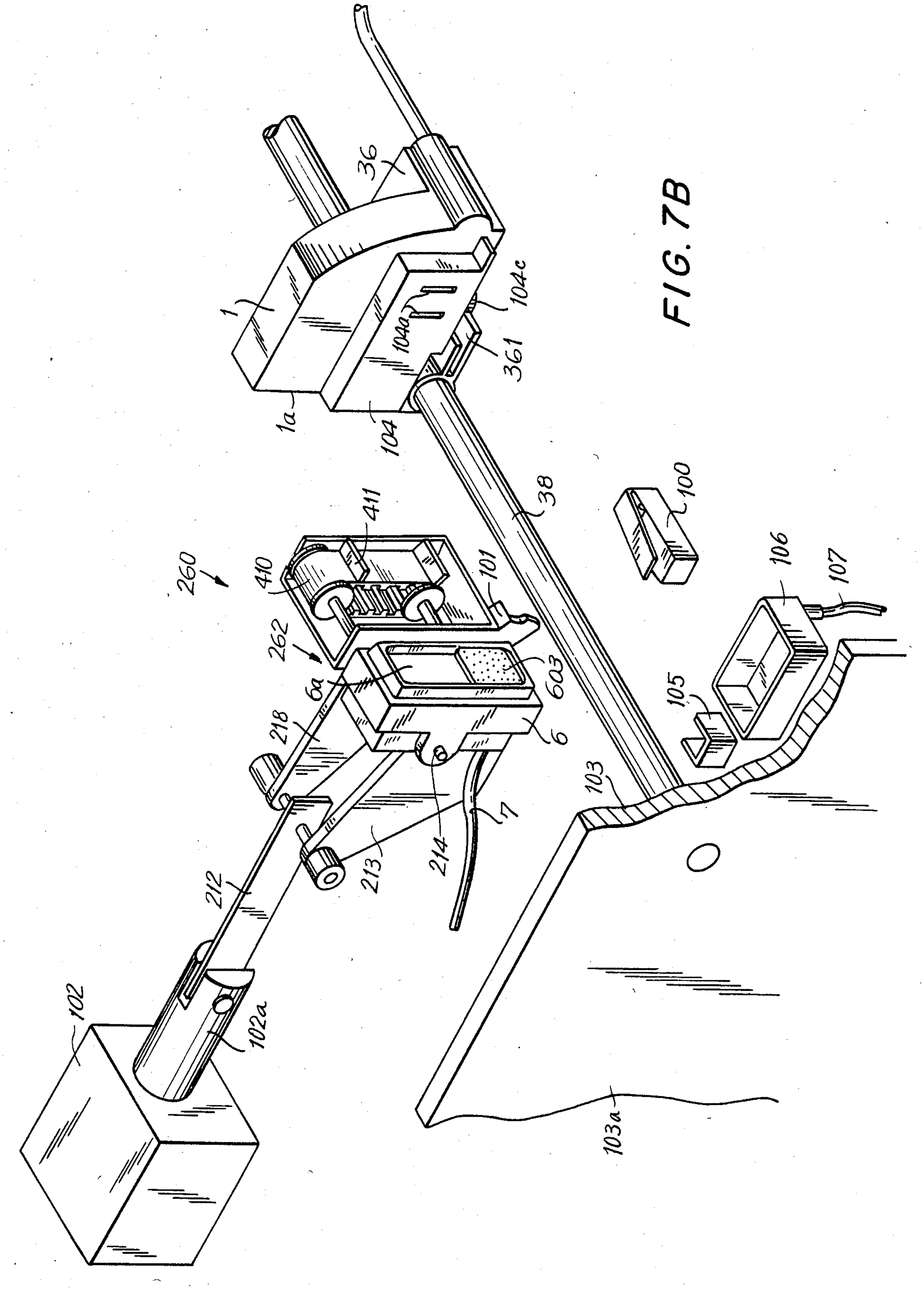
FIG. 7B is a perspective view illustrating another printer arrangement in which the ink jet recording apparatus of the present invention is incorporated in a serial printer.

FIG. 7B is illustrative of another printer arrangement in which the present invention is incorporated in a serial printer 260, the view showing printer parts around a cleaning mechanism and an ink suction cap. When a carriage 36 is moved from a printing position to a nonprinting position, a projection 361 on carriage 36 engages a microswitch 100 attached to printer frame 103 to actuate microswitch 100, whereupon carriage 36 is stopped by a stopper 101 mounted on a body, indicated at 262, composed of ink suction cap 6 and cleaning means or head cleaner 410.

At this time, head 1 is positioned in confronting relation to head cleaner 410. Head cleaner 410 when actuated cleans the nozzle face 1*a* of head 1. Stopper 101 serves to stop carriage 36 accurately in position. Carriage 36 can be stopped by deenergizing a drive source such as a motor for carriage 36 slightly after microswitch 100 has been actuated.

When the cleaning operation is completed, a solenoid 102 is energized to retract ink suction cap 6 with stopper 101 being moved away from the position in which carriage 36 is stopped. Carriage 36 then moves to the left as depicted in FIG. 7B until it abuts against a left printer frame member 103*a*, whereupon head 1 faces ink suction cap 6. Deenergization of solenoid 102 allows ink suction cap 6 to move under the returning force of a spring into sealing contact with the nozzle face 1*a* of the head 1. A pump, described in detail below, is then actuated to charge ink into or discharge ink from head 1.

Figure 16:
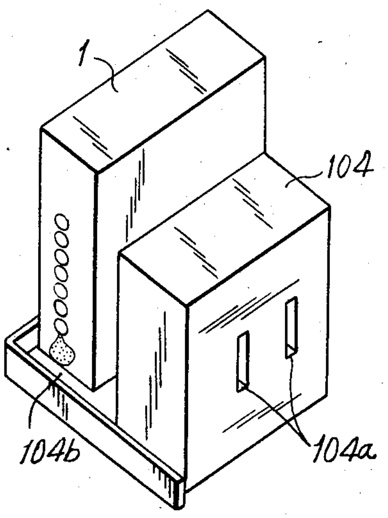
FIG. 16 is a top perspective view of another embodiment of the ink jet recording head of the present invention.

When ink charging is about to finish, excessive ink is liable to flow out of the nozzle as ink has been excessively introduced through the nozzle for reliable ink charging. Such a difficulty can be avoided by opening ink suction cap 6 slightly after the pump has been deenergized, as described hereinbelow. However, some ink remains attached to nozzle face 1*a*, and there is a danger for such attached ink to drop onto the bottom of the printer while the printer is in operation. To cope with this problem, head 1 has an ink absorbing container 104 including an ink receiver tray 104*b* (FIG. 16) for receiving ink being absorbed into the ink absorbing container 104 such as by a porous absorbent material contained in container 104. Ink absorbing container 104 has slots 104*a* in its left-hand wall. When carriage 36 is moved to the left-hand end of the printer depicted in FIG. 7B, arms 105 attached to frame member 103 enter slots 104*a* to compress the porous abosrbent in the container 104 to squeeze ink out of the porous absorbent. The squeezed ink is discharged through a discharge port 104*c* in a lower portion of container 104 into an ink receiver 106, from which the ink is led by a conduit 107 into a drain ink container. Therefore, the ink can be reliably discharged even when the absorbent in the container 104 is saturated with ink after use over a long period of time.

Figure 8:
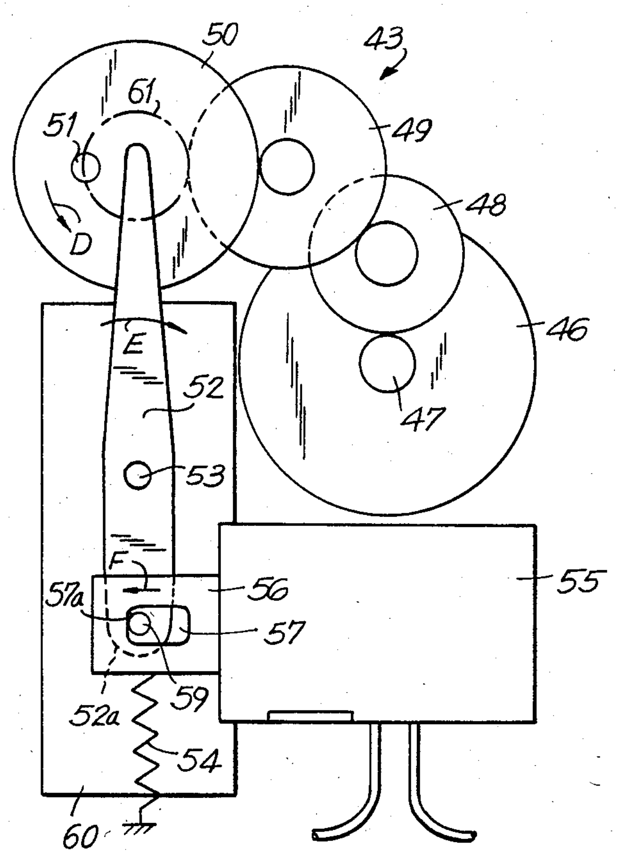
FIGS. 8 and 9 are side elevational views of an ink supply system for use with the present invention.
Figure 9:
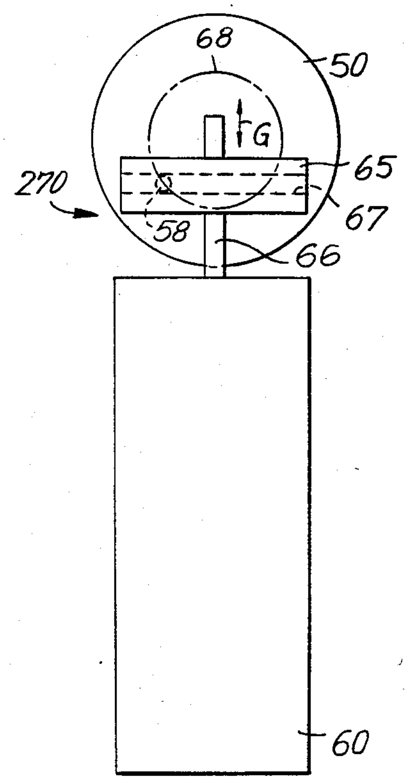
Figure 10:
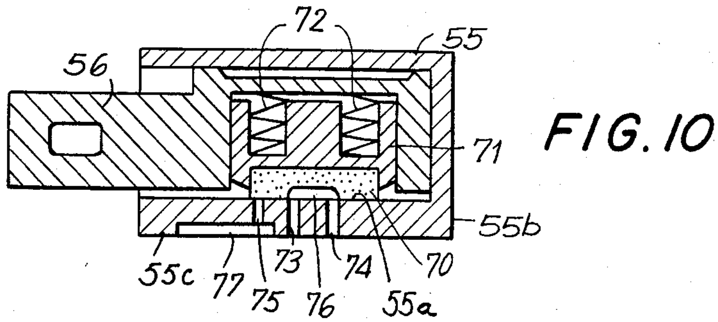
FIG. 10 is a cross-sectional view of the directional control valve of the present invention depicted in FIG. 8.
Figure 11:
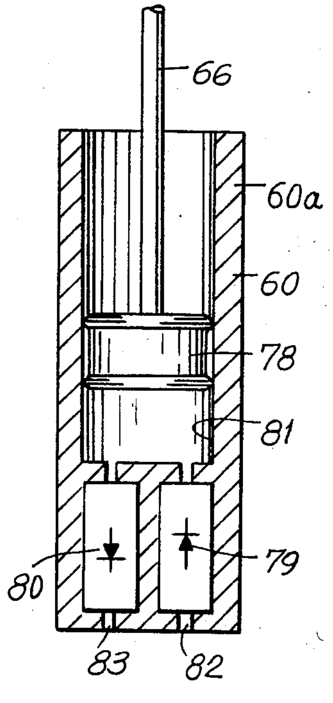
FIG. 11 is a cross-sectional view of a pump of the present invention depicted in FIG. 9.

FIGS. 8 and 9 depict in detail ink supply system 43 as illustrated in FIG. 7A, and FIGS. 10 and 11 show in detail the directional control valve 4 and pump 8 depicted in FIG. 2. Ink supply system 43 includes a d-c motor 46 for powering the directional control valve and the pump. Motor 46 may be an inexpensive one since it is energized for short intervals of time and does not need to be durable in construction. D-c motor 46 has a rotatable shaft 47 from which rotative power is transmitted through a train of speed-reducer gears 48 and 49 to a drive wheel 50. Drive wheel 50 has on one side (FIG. 8) a pin 51 for actuating a directional control valve 55 which corresponds to valve 4 in FIG. 2 and on the other side (FIG. 9) a pin 58 for actuating a pump 60 which corresponds to pump 8 in FIG. 2.

When drive wheel 50 rotates, pin 51 rotates along a circular path 61 shown by the phantom circle in FIG. 8 into engagement with a valve actuation lever 52. Valve actuation lever 52 is angularly movable in the direction of arrow E about a shaft 53, and is urged by a tension spring 54 attached to an end 52*a* of lever 52 remote from drive wheel 50 so as to be displaced into a position in which lever 52 engages pin 51 in alignment with the central axis of drive wheel 50. The end 52*a* of valve actuation lever 52 to which tension spring 54 is attached has thereon a pin 59 received in an opening 57 in a slider arm 56 secured to directional control valve 55. As will be described in detail with reference to FIG. 10, directional control valve 55 is responsive to movement of slider 56 for changing paths of fluid flow therein. When d-c motor 46 is energized to rotate drive wheel 50 in the direction of arrow D, pin 51 is brought into engagement with valve actuation lever 52 and rotates lever 52 in the direction of arrow E. Angular movement of valve actuation lever 52 causes pin 59 to push an end 57*a* of opening 57 in slider 56 for displacing slider 56 in the direction of arrow F, until fluid paths in directional control valve 55 are changed.

Conversely, when d-c motor 46 is rotated in the opposite direction to rotate drive wheel 50 in a direction opposite to the direction of arrow D, slider 56 is caused to be shifted in a direction opposite to the direction of arrow F, whereupon the original path of fluid flow is established again in directional control valve 55. Therefore, directional control valve 55 can be changed over in response to the rotating direction of d-c motor 46. Slider 56 is displaced by pin 51 through valve actuation lever 52 upon first revolution of drive wheel 50. Since slider 56 remains displaced unless subjected to external forces applied, only valve actuation lever 52 is continuously actuated when drive wheel 50 makes successive revolutions. When pin 51 is moved out of engagement with lever 52, lever 52 is brought back to the illustrated central position under the resiliency of spring 54. At this time, slider 56 does not move back since there is enough play around pin 56 within opening 57.

Drive wheel 50 also serves to actuate pump 60 through a pump actuator unit 270 depicted in FIG. 9 which is coupled to the other side of drive wheel 50. Pin 58 secured to drive wheel 50 is received in a slot 67 in a pin follower 65 coupled to a piston shaft 66. Slot 67 extends perpendicularly to the axis of piston shaft 66. When drive wheel 50 rotates, pin 58 also rotates along a circular line 68 indicated by the dot-and-dash line in FIG. 9 to actuate pin follower 65, whereupon piston shaft 66 reciprocably moves in the direction of arrow G. Pump 60 has an internal construction as shown in FIG. 11, and effects its pumping action upon reciprocable movement of piston shaft 66. Piston shaft 66 can be driven by drive shaft 50 irrespective of directions of rotation of drive wheel 50.

With the illustrated embodiment, directional control valve 55 and pump 60 can be actuated by a single d-c motor 46. The manner in which ink is loaded into and drained from the recording head by actuation of the direction control valve and the pump will now be described.

For loading recording head 1 with ink, directional control valve 55 is required to couple recording head 1 to ink tank 2. Assuming that slider 56 of directional control valve 55 is required to be pushed in a direction opposite to that of arrow F in FIG. 8 so as to connect recording head 1 to pump 60, d-c motor 46 is energized to rotate drive wheel 50 in a direction opposite to that of arrow D. Upon first revolution of drive wheel 50, slider 56 is caused to move in the direction opposite to that of arrow F, thereby coupling recording head 1 to ink conduit 3 coupled to ink tank 2. As drive wheel 50 further rotates, pump 60 is actuated to draw ink from the ink tank into the recording head to fill the head with ink. To drain ink from the recording head, d-c motor 46 is rotated in the opposite direction to rotate drive wheel 50 in the direction of arrow D, whereupon slider 56 is shifted in the direction of arrow F to thereby vent the conduit coupled to the printing head to atmosphere. Continued rotation of drive wheel 50 causes pump 60 to be actuated for drawing air into the recording head until ink in the head is replaced with air and hence is drained from the head. Thus, the same function as that illustrated in FIG. 2 can be performed.

FIG. 10 is a cross-sectional view illustrative of the internal construction of directional control valve 55. Valve 55 comprises a packing material 70 molded of rubber and supported on a packing holder 71 that is mounted in slider 56. Packing 70 is pressed against an inner wall 55*a* of a body 55*b* of directional control valve 55 under the resiliency of a spring 72 acting between slider 56 and packing holder 71. Inner wall 55*a* of valve body 55*b* has a port 73 coupled to the conduit 3-2 coupled to the recording head, a port 74 coupled to the conduit 3-1 coupled to the ink tank, and a port 75 vented to atmosphere. Ports 73, 74 and 75 are mutually aligned in the direction in which slider 56 is movable. The distance between ports 73 and 74 is substantially equal to that between ports 73 and 75. Packing 70 has a recess 76 which is so sized and located to couple ports 73 and 74 when slider 56 is displaced to the rightmost position as shown in FIG. 10. When slider 56 is moved to the left as depicted in FIG. 10, packing 70 is also displaced to the left to enable the recess 76 to couple port 73 to port 75.

The interval that the slider 56 is movable is selected so as to be equal to the distance between two adjacent ports. Thus, movement of slider 56 to the right causes ports 73 and 74 to be interconnected, allowing fluid communication between the recording head and the conduit coupled to the ink tank. Conversely, when slider 56 is moved leftward, ports 73 and 75 are interconnected to thereby vent the conduit coupled to the recording head to atmosphere. The foregoing performance of directional control valve 55 can be effected in this manner. An air filter 77 may be attached to an outer wall 55*c* covering port 75 vented to atmosphere for preventing dust from being introduced from the atmosphere into the recording head.

FIG. 11 is a cross-sectional view of the internal construction of pump 60. Pump 60 comprises a cylinder 60*a* in which a piston 78 fixed to piston shaft 66 is slidably movable. Vertical reciprocal movement of piston shaft 66 therefore repeats alternate pressurization and decompression of a cylinder chamber 81. Pump 60 also includes a pair of one-way valves 79 and 80 directed in opposite directions. One-way valve 79 serves to allow a fluid to flow from the exterior into cylinder chamber 81 upon decompression of chamber 81. One-way valve 80 serves to allow a fluid to flow from cylinder chamber 81 to the exterior when cylinder chamber 81 is pressurized. The one-way valves may be of the wellknown type utilizing a rubber body or a ball, and the construction thereof is readily apparent to those skilled in the art.

Pump 60 is actuated when piston shaft 66 reciprocably moves up and down for repeated alternate pressurization and decompression of cylinder chamber 81. The pumping action can be carried out by such intermittent pressurization of cylinder chamber 81 to introduce the fluid via an inlet 82 of one-way valve 79 and to discharge the fluid via an outlet 83 of one-way valve 80. Inlet 82 is connected via the conduit 7 to the ink suction cap 42 (FIG. 7), and outlet 83 is connected via the conduit 7 to the drain tank 9 to perform the function described above.

Figure 17:
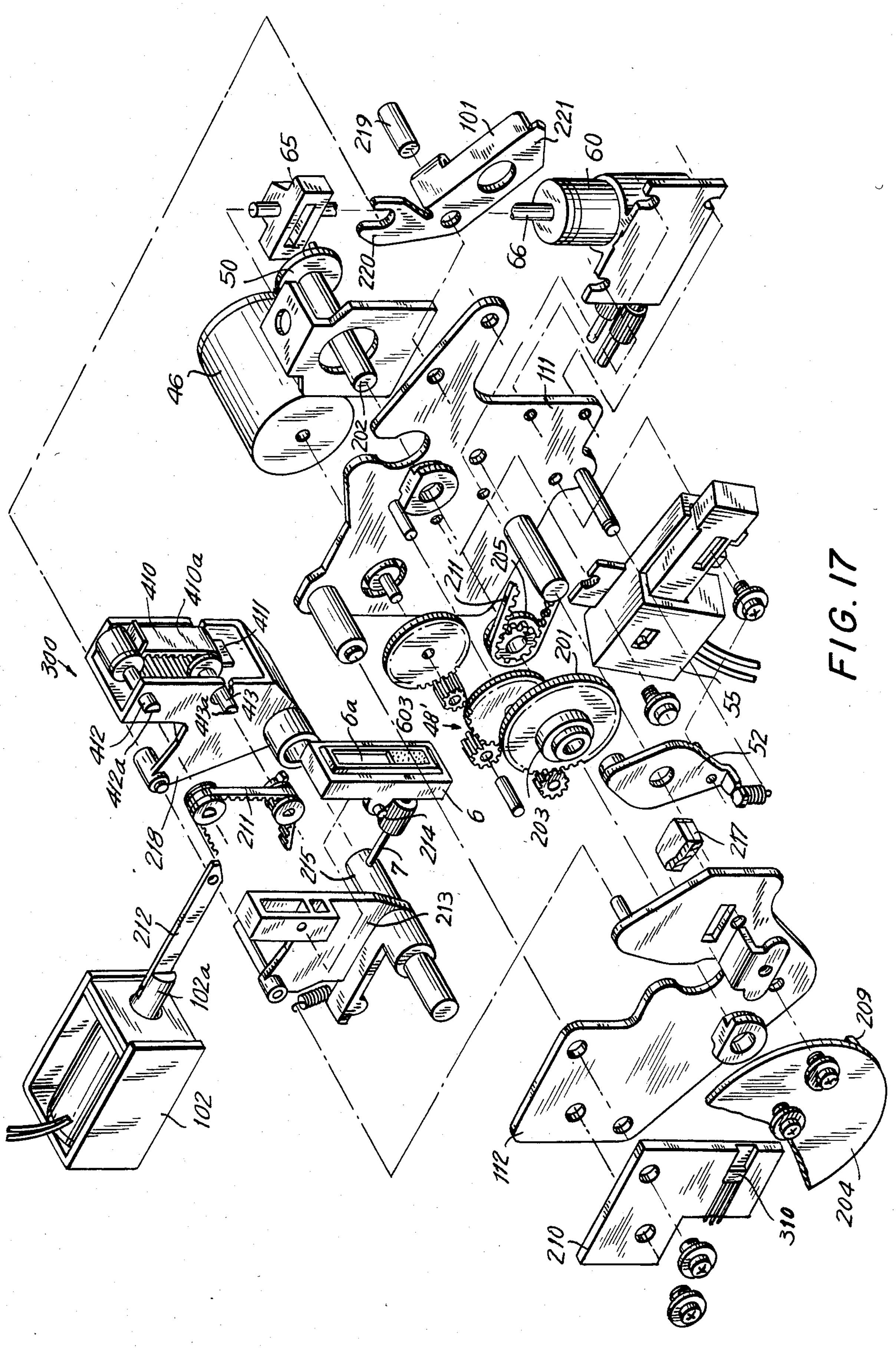
FIG. 17 is an exploded perspective view showing in detail the construction of the driver mechanism for an ink head cleaner and an ink suction cap as depicted in FIG. 7B.

Reference is now made to FIG. 17 which is an exploded perspective view showing in detail a driver 300 for the unit body of cleaner 410 and ink suction cap 6 as shown in FIG. 7B. FIG. 17 corresponds to FIGS. 8 through 11 which show in detail ink supply system 43 illustrated in FIG. 7A. Identical parts shown in FIG. 17 are denoted by like reference characters shown in FIGS. 8 through 11. Motor 46 serves as a drive source for driving pump 60, directional control valve 55, cleaner 410 and other operating parts. Ink suction cap 6 and cleaner 410 are actuated by solenoid 102. All of these parts are mounted on first and second subframes 111 and 112 to form a single unit which is attached to the left-hand frame member 103*a* (FIG. 7B) of the printer.

Rotative power from motor 46 is transmitted through a train of speed-reducer gears 48′ to a gear 201 having a shaft 202 on which there are mounted an actuator plate or drive wheel 50 for driving pump 60, a cam 203 for driving directional control valve 55, a detector plate 204 for detecting a lower limit of stroke of pump 60, and a belt wheel 205. Pump 60 has piston shaft 66 reciprocably movable for pump operation by pin follower 65 with which pin 58 on actuator plate 50 engages. Pump 60 includes a piston and cylinder having a low coefficient of friction. According to this embodiment, the piston is preferably made of rubber to provide airtightness under its own resiliency, and is coated on its surface with a layer of fluorine-contained resin for a small coefficient of friction. Such fluorine-contained resin may preferably be a coating agent of bound rubber such as "DAI-EL Latex" manufactured by Daikin Kogyo K.K.

Figure 18:
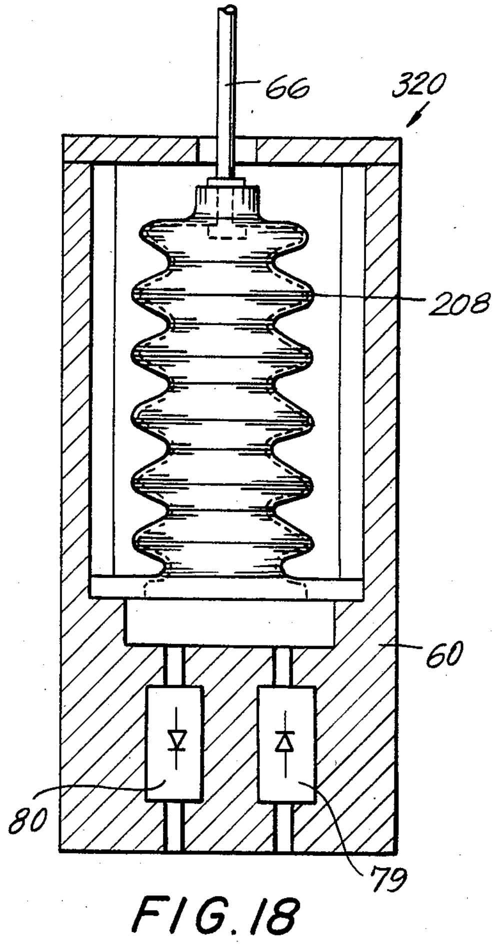
FIG. 18 is a sectional view of another embodiment of an ink jet pump.

The pump of the piston-cylinder type as shown in FIG. 8 may be replaced with a bellows pump 320 as shown in FIG. 18. Bellows pump 320 of FIG. 18 includes a bellows 208 of rubber having a piston shaft 66 on one end thereof and mounted on a pump body 60 with an airtight seal. Bellows 208 can be compressed and expanded by reciprocably moving piston shaft 66 for pumping action through one-way valves 79 and 80. Since the bellows pump has no sliding parts, it is more reliable in operation.

Returning to FIG. 17, cam 203 mounted on shaft 202 serves to actuate directional control valve 55. Cam 203 is equivalent to pin 51 shown in FIG. 8, and its operation is the same as that of pin 51. Directional control valve 55 includes a packing slidable for changing flow passages as described above. The packing should be of a low coefficient of friction and provide a desired degree of airtightness, and for this reason it is coated with a layer of fluorine-contained resin.

Detector plate 204 serves to detect a lower stroke limit of the piston of pump 60. A permanent magnet 209 is fixed to detector plate 204. Second subframe 112 has a base plate 210 attached thereto and supporting thereon a magnetic detector 310 for detecting a position on detector plate 204 while detector plate 204 makes one revolution. The lower stroke limit of the piston of pump 60 can be detected by bringing such position on detector plate 204 into conformity with the lower stroke limit. When ink suction cap 6 is disengaged from head 1 upon deenergization of motor 46 during the expansion stroke of the piston at the time of charging ink into head 1, the ink is ejected out of the nozzle on head 1. This ejection ink can be avoided by stopping pump 60 and hence motor 46 and opening ink suction cap 6 during the compression stroke of the piston, or most reliably at the lower stroke end of the piston. In reality, however, pressurization and depressurizaiton in ink suction cap 6 is slightly delayed because ink flows through conduit 7 between pump 60 and ink suction cap 6. Therefore, there still remains a danger for ink to be ejected outwardly when ink suction cap 6 is removed from head 1 immediately after the motor has been deenergized even during the compression stroke of the pump piston. This shortcoming can be eliminated by stopping the motor during the compression stroke of the piston and releasing ink suction cap 6 a few seconds (1 to 5 seconds according to experiments) thereafter. In the ink charging operation, therefore, it is necessary to effect control for deenergizing the motor 46 by detecting the compression stroke and lower stroke limit of the piston with detector plate 204.

A belt 211 travels around belt wheel 205 mounted on shaft 202 for operating cleaner 410. Cleaner 410 is composed of a flat ring 410*a* having a plurality of scraper projections 411 and extending around two cleaner shafts 412 and 413. Belt 211 also extends around ends 412*a* and 413*a* of cleaner shafts 412 and 413, respectively. When gear 201 rotates upon energization of motor 46, belt 211 operates cleaner 410 to enable the scraper projections 411 to scrape dust, fibrous matter and other impurities off the nozzle face 1*a* of head 1 when cleaner 410 faces head 1.

Figure 19:
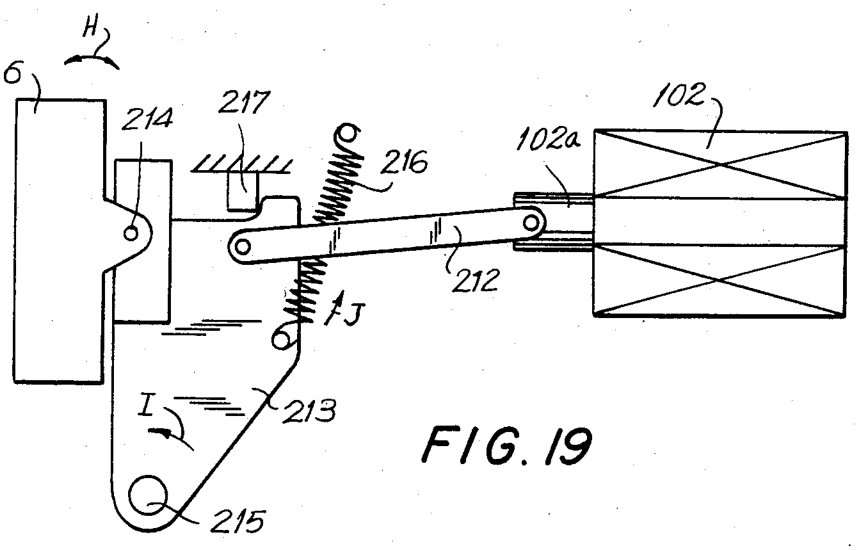
FIG. 19 is a diagrammatic view showing the operation of the ink jet head suction cap.

Operation of solenoid 102 for actuating ink suction cap 6 and cleaner 410 will now be described with reference to FIGS. 17 and 19. Solenoid 102 has a moveable iron core 102*a* held in engagement with a cap support 213 through an actuator lever 212. Ink suction cap 6 is pivotably mounted by a pin 214 on cap support 213 for slight angular movement about pin 214 in the direction of arrow H. Such movement of ink suction cap 6 serves to keep the same airtight when in engagement with head 1. Cap support 213 is supported on shaft 215 and urged by a tension spring 216 to move in the direction of arrow J. Thus, cap support 213 is urged to angularly move in the direction of arrow I into abutment against an abutment stopper 217. When solenoid 102 is energized, the movable iron core 102*a* is pulled into solenoid 102 to cause actuator lever 212 to turn cap support 213 in a direction opposite to the direction of arrow I against the force of tension spring 216. Such angular movement of the cap support 213 causes ink suction cap 6 to disengage from the nozzle face 1*a* of head 1, and allows head 1 to move to a position confronting ink suction cap 6.

Cleaner 410 is selectively movable into or out of contact with the head as described below in detail. A cleaner support 218 for cleaner 410 is mounted on shaft 215 and hence is biased by tension spring 216. Thus, cleaner 410 moves with the ink suction cap 6 in response to energization of solenoid 102. When solenoid 102 remains deenergized while head 1 is confronting cleaner 410, scraper projection 411 of the cleaner 410 is held against the nozzle face of head 1 to scrape dust off the nozzle face in response to energization of motor 46. When the solenoid 102 is energized, projection 411 is retracted out of contact with the nozzle face.

An advantage accruing from such an arrangement will be described with reference to FIG. 7B. Solenoid 102 is not energized when carriage 36 is displaced away from the printing region to the position which faces cleaner 410. Since projections 411 are made of rubber, they are resiliently deformed to allow head 1 to move toward cleaner 410. After head 1 has been cleaned in this position, solenoid 102 is energized to retract ink suction cap 6, and then head 1 is moved to a position confronting ink suction cap 6. Solenoid 102 is now deenergized to allow ink suction cap 6 to engage head 1 in an airtight manner. Pump 60 is now actuated to refresh the ink in head 1. Thereafter, solenoid 102 is energized once more to retract ink suction cap 6 and cleaner 410, and carriage 36 is quickly moved back to the printing region. At this time, the nozzle face 1*a* of head 1 is kept out of engagement with scraper projections 411 of cleaner 410. More specifically, after cleaner 410 has scraped dust, paper powder, fibrous matter and the like off the nozzle face, scraper projections 411 carry away such foreign matter. If projections 411 of the cleaner were brought into contact with the nozzle face after head 1 has been cleaned, the nozzle face would be smeared again with impurities. In the illustrated embodiment, solenoid 102 is actuated to keep projections 411 of cleaner 410 out of contact with the nozzle face after the head 1 has been cleaned, while head 1 is being displaced into the printing region.

Returning to FIG. 17, in addition to FIG. 7B, operation of stopper 101 for perfectly stopping the head in confronting relation to cleaner 410 will be described. Stopper 101 is angularly movably mounted on the first subframe 111 by a pin 219, and has one end 220 held in engagement with actuator lever 212. When solenoid 102 is energized, stopper 101 is angularly moved about pin 219 to displace the other end 221 of stopper 101. When solenoid 102 remains deenergized, end 221 of stopper 101 serves to stop carriage 36 for bringing head 1 and cleaner 410 into accurate mutual confronting relation. Energization of solenoid 102 displaces stopper 101 out of abutting engagement with carriage 36.

Figure 12:
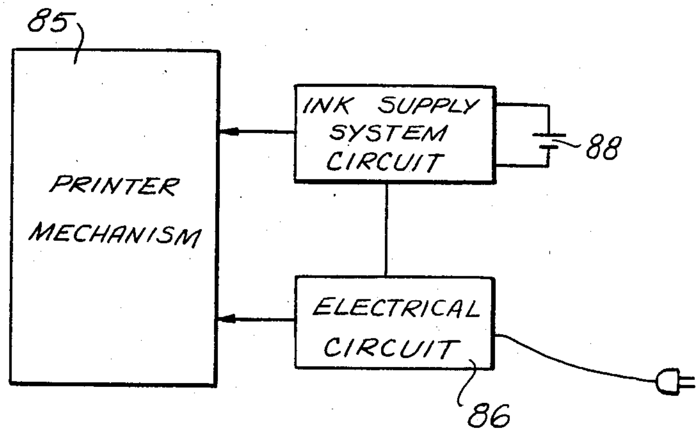
FIG. 12 is a block circuit diagram of an electric circuit for the serial printers depicted in FIGS. 7A and 7B.

FIG. 12 is a block diagram including an electrical circuit 86 for the serial printer illustrated in FIGS. 7A and 7B. Depicted is a printer mechanism 85 and an electrical circuit 86 for controlling printer mechanism 85, electrical circuit 86 being powered by a commercial power supply. According to an embodiment of the present invention, there is provided an ink supply system circuit 87 for actuating the ink supply system described above to drain ink from the recording head after the power supply has been turned off to effect other operations, the ink supply system 87 being powered by a rechargeable battery 88. The construction of electrical circuit 86 will not be described here, as known to those skilled in the art, but the ink supply system circuit 87 will be described in detail with reference to FIGS. 12 through 14.

Figure 13A:
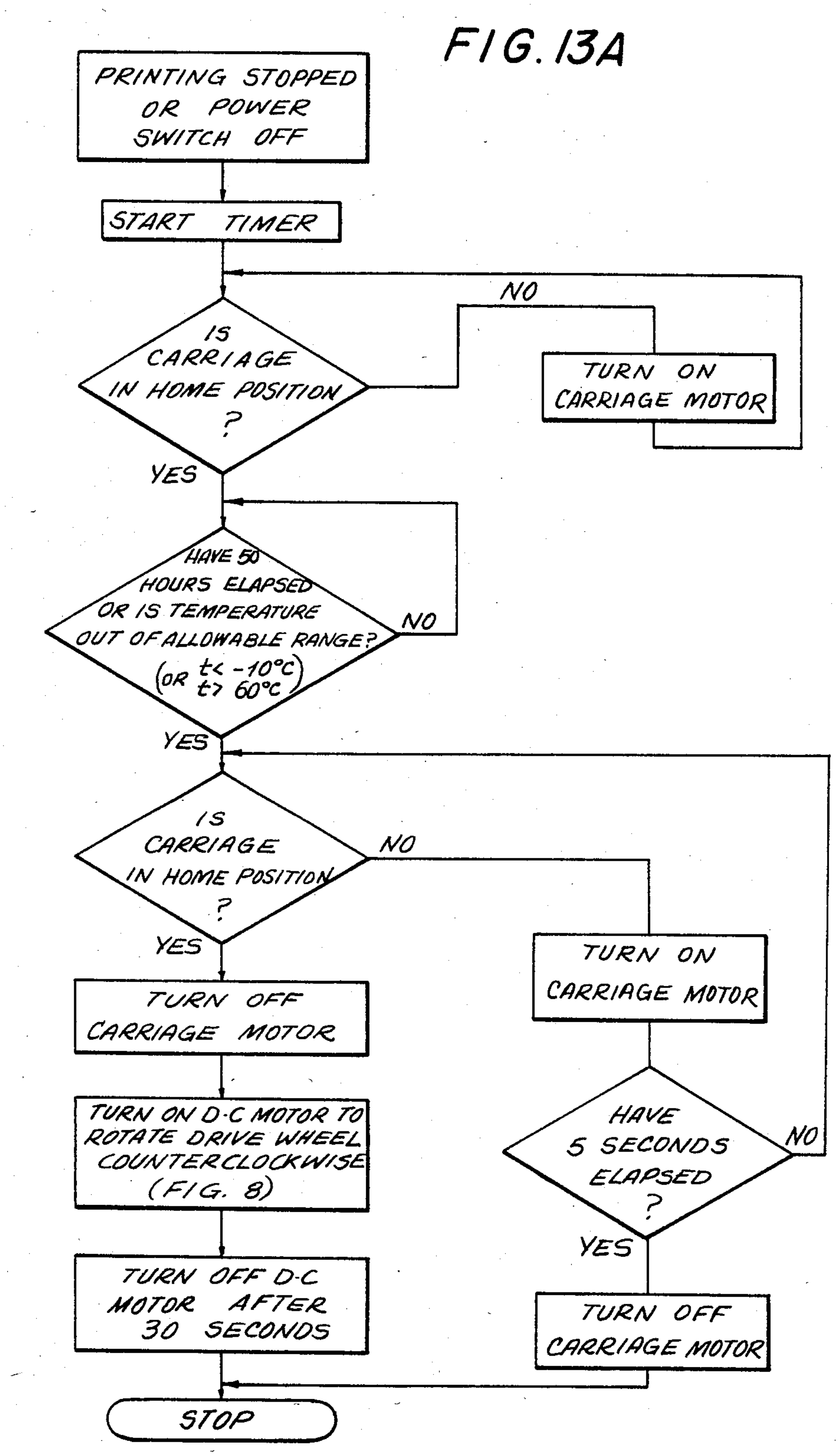
FIGS. 13A and 13B are flow charts for describing the series of operations of the ink supply system according to an embodiment of the present invention.
Figure 13B:
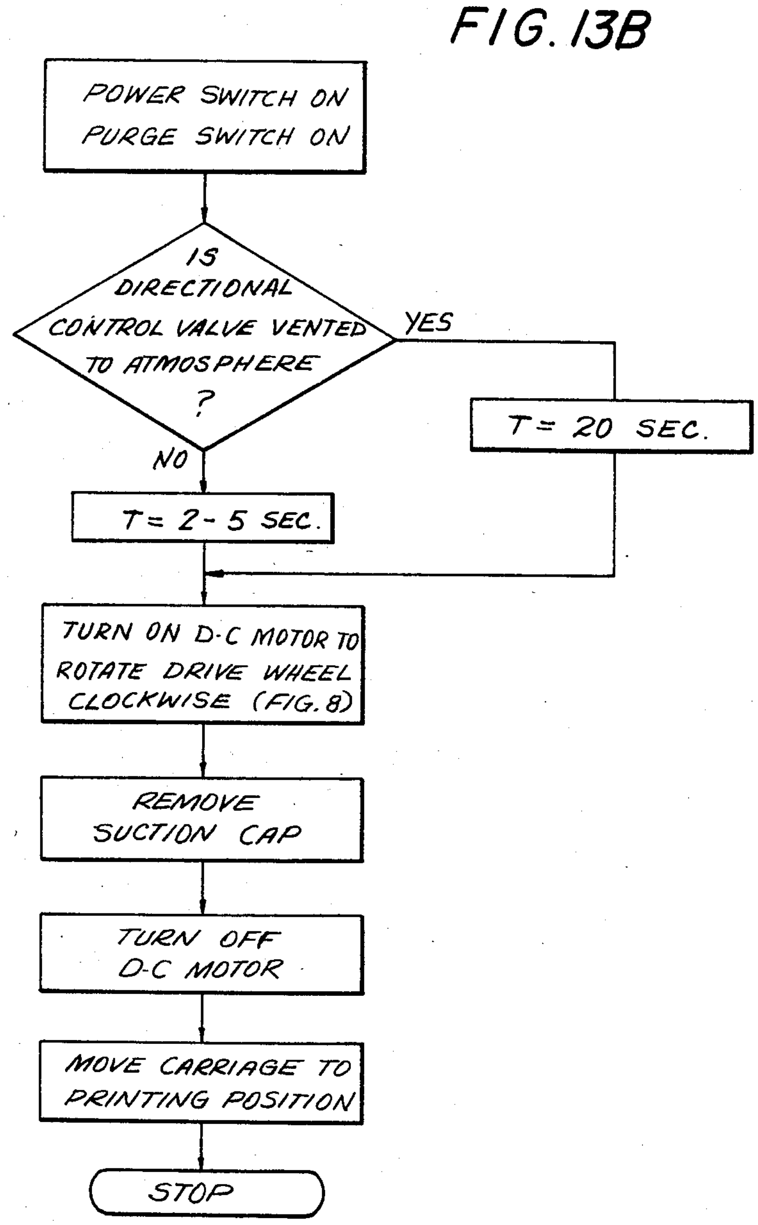

FIG. 13A is a flowchart for explaining the sequence of steps performed by the ink supply system of the present invention during an ink draining process, and FIG. 13B is a flowchart for explaining the sequence of steps performed by the ink supply system during an ink loading process. In FIG. 13A, a timer in the ink supply system circuit starts when the power supply for the printer is turned off. If the carriage is not in the home position, a carriage motor is energized to bring the carriage back to the home position, in which the nozzle surface of the recording head is capped by the ink suction cap. It is then determined whether a time period of 50 hours has elapsed on the timer, and whether the temperature is out of the allowable range (i.e., if $t<-10°$ C. or $t>60°$ C.). Thereafter, as a precaution, the carriage motor would be energized to return the carriage to the home position if the carriage were not already in the home position. Then, the d-c motor is energized to rotate the drive wheel in the direction of arrow D (FIG. 8) for 30 seconds, during which time the directional control valve and the pump are actuated to drain ink off the recording head.

The series of operations shown in FIG. 13B will now be described. When the power supply switch is turned on, or a purge switch is turned on upon printing failure, the timer is set for different time intervals dependent on whether the directional control value is switched to be open to atmosphere or coupled to the tank. The d-c motor is then energized to rotate the drive wheel in the opposite direction for the periiod of time set by the timer. The reason for such an operation is that when the directional control valve is vented to atmosphere, ink has already been discharged from the recording head, and the d-c motor needs to be energized for 20 seconds in order to refill the recording head with ink. Conversely, when the directional control valve is coupled to the tank, ink has not been drained from the recording head, and the d-c motor is driven for a short period of time, e.g., 2 to 5 seconds, for refreshing the recording head. Subsequently, the ink suction cap is removed, the d-c motor is deenergized, and the carriage is moved to a printing position.

A circuit arrangement for effecting the operations of FIGS. 13A and 13B will now be described with reference to FIG. 14. A timer 90 is composed of an oscillator and a frequency divider. Timer 90 is set to produce an output having a period of 100 hours when a frequency-divider selection terminal 91 is high, and to produce an output having a period of 30 seconds when the terminal 91 is low. A temperature detection terminal 92 is connected to a temperature sensor comprising a thermal reed switch composed of a reed switch and a thermosensitive magnetic material and operable on transition between property changes marked by the Curie temperature of ferrite. The temperature sensor is of the type which is actuatable differently in two temperature ranges, or the make-break-make-type which makes the circuit at $-10°$ C. or below and at 60° C. or higher, and breaks the circuit at the other temperatures. A terminal 93 is connected to d-c motor 46 (FIG. 17), which is energizable by the circuit shown to rotate the drive wheel in the direction of arrow D (FIG. 8) only for draining ink from the recording head.

Figure 15A:
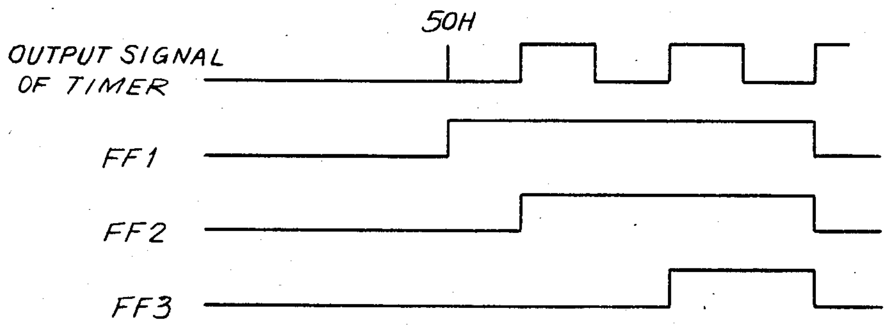
FIGS. 15A and 15B are timing charts illustrative of operations of the circuit depicted in FIG. 14.
Figure 15B:
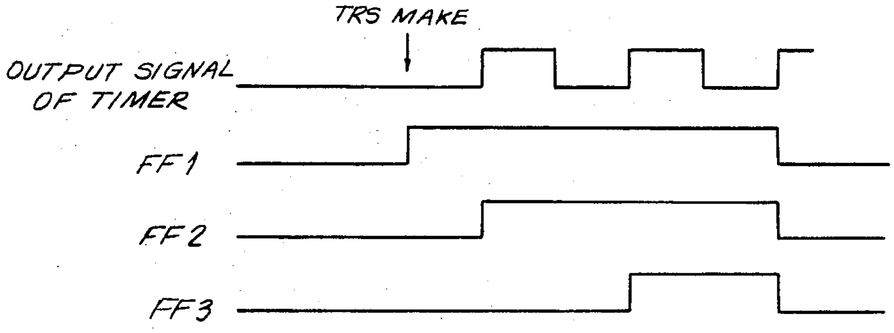

A circuit for driving motor 46 to fill recording head 1 with ink is incorporated in the printer circuit. A terminal 94 is connected to a detector for detecting the carriage when it is in the home position. When the carriage is in the home position, terminal 94 breaks the circuit. A terminal 95 supplies a signal to the carriage motor for moving the carriage to the home position. A detector 96 is provided for the power supply switch, to which a voltage of 12 V is applied when the power supply is turned on and no voltage is applied when the power supply is off. A switching circuit 97 for a rechargeable secondary battery allows the battery to be charged while the printer power supply is on, and to serve as a power supply when the printer power supply is off in order to carry out the following operation. While the voltage of 12 V is being applied, timer 90, flip-flop FF1 and flip-flop FF4 are reset, timer 90 is not actuated, and the battery switching circuit 97 is turned on. When the voltage of 12 V is lost, the timer starts operating. When the carriage is not in the home position, terminal 94 makes the circuit to cause the output $\overline{Q}$ of flip-flop FF5 to go low, thereby driving the carriage through terminal 95. When the output of timer 90 is changed from the low level to the high level upon the elapse of 50 hours, flip-flop FF1 is set and timer 90 is changed over to set itself for producing an output of 30 seconds. Timer 90 is also set to produce the 30-second output when the terminal 92 makes the circuit to set flip-flop FF1. These timings are depicted by the timing charts of FIGS. 15A and 15B.

Flip-flop FF2 is set at the leading edge of a next output from timer 90. When the carriage is not in the home position, flip-flop FF5 is set by flip-flop FF2 to bring the carriage back to the home position. If the carriage is not in the home position, or the carriage is not brought back to the home position regardless of energization of the carriage motor for 30 seconds, when flip-flop FF3 is set at the leading edge of a next output of the timer 90, flip-flop FF6 is reset, flip-flop FF4 is set, and the circuit is in a power-down mode, whereupon no ink is drained from the recording head. When the carriage is in the home position, flip-flop FF6 is not reset and flip-flop FF3 is set to energize the d-c motor while the output $\overline{Q}$ of flip-flop FF3 is low. At the trailing edge of a next output from the timer 90, flip-flop FF3 is reset to deenergize the d-c motor, and at the same time flip-flop FF4 is set to render its output $\overline{Q}$ low, whereupon battery switching circuit 97 is turned off.

Figure 14:
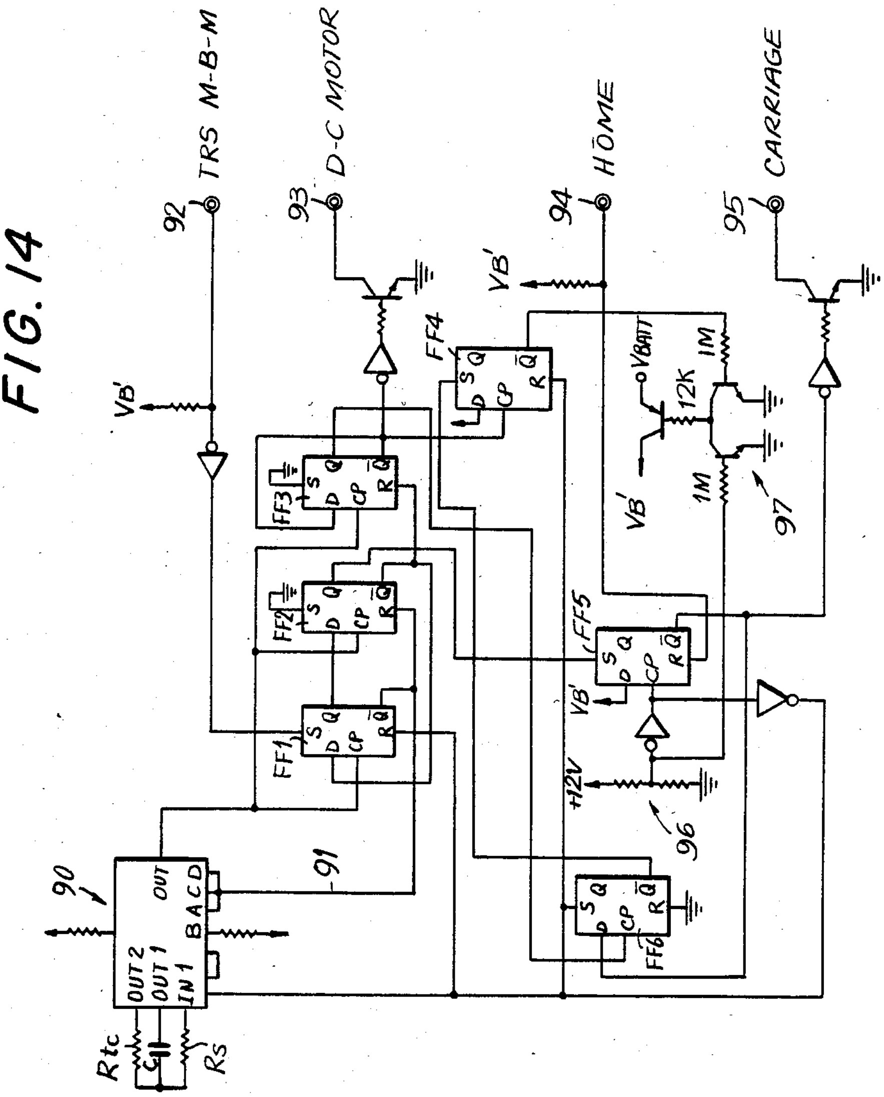
FIG. 14 is a detailed circuit diagram of an ink supply system circuit according to an embodiment of the present invention.

Accordingly, the circuit shown in FIG. 14 serves to perform the operations shown in the flowchart of FIGS. 13A and 13B. The timer may be actuated from the exterior so that it can be started when the power supply is not cut off. For example, the timer may be started when the printing operation is stopped for effecting ink drainage 50 hours after the printing operation has been finished, even while the power supply is on.

In the foregoing embodiment, the secondary battery is used after the main power supply has been turned off to drain ink from the recording head upon elapse of a certain interval of time. However, the secondary battery may be dispensed with, and a delay (time lag) relay may instead be employed to cut off the power supply to the control circuit and the mechanical moving parts a predetermined interval of time after the main power supply switch has been turned off. Such a modification can easily be made, and is advantageous where it is necessary to drain ink in a short period of time after the main power supply switch has been turned off.

Upon turning off the switch, the suction system begins to be operated to draw ink out of the ink jet head and the first ink conduit. After this operation, the power supply is stopped.

While various embodiments of the present invention have been described, the present invention should not be interpreted as being limited to the illustrated embodiments, but improvements and modifications may be made without departing from the scope of the present invention. For example, the recording apparatus may be incorporated in devices other than the serial printer. The pump and the directional control valve may be modified, and the conditions set for ink drainage may be changed. Furthermore, the invention is applicable to ink jet heads of other types.

During a printing operation, when an operator finds the presence of air bubbles in the ink jet head, if manually turning on the switch to produce a signal which is equal to the signal generated upon reaching the aforementioned condition set for ink drainage, the air bubbles are easily removed at any time.

With the present invention, as described in detail above, a directional control valve or switching mechanism is disposed in a conduit extending between an ink jet head and an ink tank, and can be selectively changed over to connect an ink head conduit to an ink tank conduit or to vent the ink head conduit to atmosphere. An ink suction cap is movable into intimate contact with the nozzle surface of the ink jet head. The ink suction cap is coupled to a suction system. Such an arrangement allows ink to be drained from the ink jet head as desired, thus preventing the nozzles from becoming clogged with ink, a problem which is most serious with the ink jet head. The ink jet head can easily and reliably be refilled with ink for a next printing operation. The switching system and the suction system can be driven by a single power source, resulting in a simpler arrangement. The foregoing construction may be combined with an ink tank which comprises an ink cartridge of laminated films of aluminum with deaerated ink sealed therein. This combination can solve the problems caused by air bubbles in ink jets. The recording apparatus of the present invention can be used under various operating conditions and represents substantial improvements in ink jet technology.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. An ink jet recording apparatus for projecting ink onto a recording medium comprising an ink jet head adapted to receive ink having an ejection nozzle means for ejecting said ink out of said ink jet head towards said recording medium, ink tank means for storing said ink and for supplying said stored ink to said ink jet head, switching means for selectively switching between a first condition where said ink tank means is in fluid communication with said ink jet head so that ink stored in said ink tank means can be supplied to said ink jet head and a second condition where said ink jet head is vented to atmosphere, cap means for selectively covering said ejection nozzle means, suction means for creating a negative pressure in said cap means, and control means for controlling the operation of said switching means, suction means and cap means during a printing start operation and a printing operation, ink stored in said ink tank means being supplied to said ink jet head when said switching means is in said first condition during said printing operation, said cap means covering said ejection nozzle means when said printing operation is completed, said cap means selectively drawing ink and air out of said ink jet head through said ejection nozzle means in response to the negative pressure created by said suction means, said cap means essentially clearing said ink jet head of ink when said switching means is in said second condition whereby ink clogging and corrosion during said no print condition can be essentially prevented, said cap means being removed from said ejection nozzle means and said printing operation commences when said switching means is in said first condition during said printing start operation, said suction means refilling said ink jet head with ink and said printing operation commencing after said switching means switches from said second condition to said first condition when said switching means is initially in said second condition during said printing start operation.

2. The ink jet recording apparatus as claimed in claim 1, further comprising a first ink conduit coupling said ink jet head to said switching means and a second ink conduit coupling said switching means to said ink tank means.

3. The ink jet recording apparatus as claimed in claim 2, wherein said switching means couples said ink jet head to said ink tank means through said first and second ink conduits when in said first condition so that ink stored in said ink tank means can flow through said first and second conduits to said ink jet head.

4. The ink jet recording apparatus as claimed in claim 3, wherein said switching means vents said ink jet head to atmosphere through said first ink conduit when in said second condition.

5. The ink jet recording apparatus as claimed in claim 4, wherein said switching means releases the fluid coupling of said first ink conduit to said second ink conduit when in said second condition.

6. The ink jet recording apparatus as claimed in claim 2, wherein said ink jet head includes an ink supply port, said first ink conduit being coupled to said ink supply port so that ink in said first ink conduit can be supplied to said ink jet head.

7. The ink jet recording apparatus as claimed in claim 6, wherein said ink jet head includes pressurization chamber means for selectively pressurizing said ejection nozzle means to eject ink therefrom.

8. The ink jet recording apparatus as claimed in claim 4 further comprising drain tank means for receiving ink drawn out of said ejection nozzle means by said suction means through said cap means, and a third ink conduit for coupling said cap means to said drain tank means.

9. The ink jet recording apparatus as claimed in claim 1, wherein said cap means includes displacement means for selectively displacing said cap means between a first position where said cap means is placed in intimate contact with said ejection nozzle means and a second position where said cap means is spaced from said ejection nozzle means.

10. The ink jet recording apparatus as claimed in claim 9, wherein said cap means includes a cavity which covers said ejection nozzle means when said cap means is in said first position.

11. The ink jet recording apparatus as claimed in claim 10, wherein said cap means includes absorbent means in said cavity for absorbing ink on said ejection nozzle means.

12. The ink jet recording apparatus as claimed in claim 8, wherein said cap means includes an ink suction port, said third ink conduit being coupled to said ink suction port, absorbent means covering said ink suction port for absorbing ink on said ejection nozzle means, said suction means drawing off the ink absorbed by said absorbent means.

13. The ink jet recording apparatus as claimed in claim 5, wherein said switching means includes a directional control valve having first, second and third openings and slider means for selectively coupling said first, second and third openings.

14. The ink jet recording apparatus as claimed in claim 13, wherein said slider means includes a packing material, said first opening being coupled to said first ink conduit, said second opening being coupled to said second ink conduit and said third opening being vented to atmosphere, said slider means moving said packing material to couple said first opening to said second opening when said switching means is placed in said first condition, said slider means moving said packaging material to couple said first opening to said third opening when said switching means is placed in said second condition.

15. The ink jet recording apparatus as claimed in claim 14, wherein said packaging material is molded from rubber and includes a recess for selectively coupling said first, second and third openings.

16. The ink jet recording apparatus as claimed in claim 15, wherein said third opening includes an air filter means for preventing dust from the atmosphere from entering said first ink conduit.

17. The ink jet recording apparatus as claimed in claim 8, wherein said suction means is a pump having a piston slidable in a cylinder, said pump having first and second one-way valve means which cooperate to direct ink drained from said ink jet head through said third ink conduit to said ink tank means.

18. The ink jet recording apparatus as claimed in claim 8, wherein said suction means is a pump having a piston and a bellows molded from rubber, said piston expanding and contacting said bellows to draw ink out of said ejection nozzle means through said cap means and into said drain tank means.

19. The ink jet recording apparatus as claimed in claim 2, wherein said first ink conduit is formed from a high-polymer material and said second ink conduit is formed from a metal.

20. The ink jet recording apparatus as claimed in claim 19, wherein said metal is a stainless steel.

21. The ink jet recording apparatus as claimed in claim 1, wherein said ink tank means is an ink bag made of an aluminum foil laminated with a high-polymer film.

22. The ink jet recording apparatus as claimed in claim 21, wherein said high-polymer film is selected from the group comprising polyethelene and nylon.

23. The ink jet recording apparatus as claimed in claim 1, wherein said control means is operable by a single power source.

24. The ink jet recording apparatus as claimed in claim 1, wherein said control means includes detector means for detecting predetermined conditions.

25. The ink jet recording apparatus as claimed in claim 24, wherein said detector means selectively detects ambient temperature and the elapse of a predetermined time interval in order to draw ink out of said ink jet head.

26. The ink jet recording apparatus as claimed in claim 24, wherein said detector means includes timer means for detecting the elapse of a predetermined time interval after which said suction means is actuated to draw ink out of said ejection nozzle means.

27. The ink jet recording apparatus as claimed in claim 24, wherein said detector means includes temperature detector means for detecting ambient temperatures, said detector means actuating said control means when said temperature detector means detects a temperature outside of a predetermined range.

28. The ink jet recording apparatus as claimed in claim 24, wherein said predetermined time interval is about one day to one week.

29. The ink jet recording apparatus as claimed in claim 1, wherein said ink jet head is formed from a substrate made of glass.

30. The ink jet recording apparatus as claimed in claim 13, wherein said first, second and third openings are linearly positioned in the direction of movement of said slider means.

31. The ink jet recording apparatus as claimed in claim 1, wherein said printing operation commences after said switching means switches from said second condition to said first condition and ink is supplied to said ink jet head for about 20 seconds when said switching means is in said second condition at said printing start operation.

32. The ink jet recording apparatus as claimed in claim 1, wherein said printing operation commences after ink is supplied to said ink jet head for between about 2 to 5 seconds when said switching means is in said first condition at said printing start operation.

33. The ink jet recording apparatus as claimed in claim 1, wherein said control means is normally operated by a main power supply, said control means including a rechargeable battery means which is recharged by said main power supply for operating said control means after said main power supply is shut off.

34. The ink jet recording apparatus as claimed in claim 33, wherein said battery means includes a power supply detector means for detecting when said power supply has been switched off.

35. The ink jet recording apparatus as claimed in claim 34, wherein said rechargeable battery means powers said control means and said suction means when said power supply detector means detects that said main power supply has been switched off.

36. The ink jet recording apparatus as claimed in claim 35, wherein said control means includes detector means for detecting predetermined conditions, said battery means powering said control means and said suction means when any of said predetermined conditions are detected.

37. The ink jet recording apparatus as claimed in claim 23, wherein said power source includes an on-off switch, said power source supplying power to said suction means for a predetermined time interval after said switch is turned off, said suction means drawing ink out of said ejection nozzle means when said switch means is vented to atmosphere to clear said ink jet head of ink.

38. The ink jet recording apparatus as claimed in claim 4 wherein when said switching means vents said ink jet head to atmosphere, said suction means is actuated to draw ink out of said ink jet head and said first ink conduit.

39. The ink jet recording apparatus as claimed in claim 4 wherein said switching means couples said first ink conduit to said second ink conduit, said suction means drains air and ink out of said ink jet head and first conduit to create a flowing of ink from said ink tank means to said ink jet head.

40. The ink jet recording apparatus as claimed in claim 17, wherein the operation of said pump is stopped in the latter half of the pressurization in said cylinder during the supply of ink to said ink jet head.

41. The ink jet recording apparatus as claimed in claim 17, wherein said cap means is taken off from the nozzle surface of said ink jet head after the operation of said pump has been stopped during the supply of ink to said ink jet head.

42. An ink jet recording apparatus for projecting ink onto a recording medium comprising an ink jet head adapted to receive ink having an ejection nozzle means for ejecting said ink out of said ink jet head towards said recording medium, ink tank means for storing said ink and for supplying said stored ink to said ink jet head, switching means for selectively switching between a first condition where said ink tank means is in fluid communication with said ink jet head so that ink stored in said ink tank means can be supplied to said ink jet head for use during a printing operation, and a second condition where said ink jet head is vented to atmosphere during a no print condition, cap means for selectively covering said ejection nozzle means and suction means for creating a negative pressure in said cap means, said cap means drawing ink and air out of said ink jet head through said ejection nozzle means in response to the negative pressure created by said suction means, said cap means essentially clearing said ink jet head of ink when said switching means is in said second condition whereby ink clogging and corrosion during said no print condition can be essentially prevented, further comprising control means for controlling the operation of said switching means and said suction means, said control means including detector means for detecting predetermined conditions, said detector means including temperature detector means for detecting ambient temperatures, said detector means actuating said control means when said temperature detector means detects a temperature outside of a predetermined range.

43. The ink jet recording apparatus as claimed in claim 42, wherein said detecting means includes timer means for detecting the elapse of a predetermined time interval after which said suction means is actuated to draw ink out of said ejection nozzle means.

44. The ink jet recording apparatus as claimed in claim 43, wherein said predetermined time interval is about one day to one week.

45. The ink jet recording apparatus as claimed in claim 43, wherein said predetermined time interval is detected after power supplied to said apparatus is shutoff.

46. The ink jet recording apparatus as claimed in claim 43, wherein said predetermined time interval is detected after a printing operation is completed.

47. The ink jet recording apparatus as claimed in claim 42, wherein said predetermined ambient temperature is above approximately 50° C.

48. The ink jet recording apparatus as claimed in claim 42, wherein said predetermined ambient temperature is near the ink freezing point.

49. A printer comprising a frame, a platen, a carriage slidably supported on said frame for travel essentially parallel to said platen, an ink jet head supported on said carriage for travel therewith, said ink jet head having ejection nozzle means facing said platen for projecting ink onto a recording medium against said platen, ink supply means for supplying ink to said ink jet head, valve means for switching between a first condition where said ink supply means is placed in fluid connection with said ink jet head for supplying ink thereto and a second condition where said ink jet head is vented to atmosphere, cap means supported on said frame proximate said platen for selectively covering said ejection nozzle means, suction means for creating a suction in said cap means, drive means for selectively moving said cap means into intimate engagement with said ejection nozzle means so that said suction created by said suction means can draw ink out of said ejection nozzle means, and control means for controlling the operation of said valve means, cap means, suction means and drive means during a printing start operation and a printing operation, ink being supplied to said ink jet head when said valve means is in said first condition during said printing operation, said cap means covering said ejection nozzle means when said printing operation is completed, said cap means essentially clearly said ink jet head of ink when said switching means is in said second condition whereby ink clogging and corrosion during said no print condition can be essentially prevented, said cap means being removed from said ejection nozzle means and said printing operation commences when said valve means is in said first condition during said printing start operation, said suction means refilling said ink jet head with ink and said printing operation commencing after said valve means switches from said second condition to said first condition when said valve means is initially in said second condition during said printing start operation.

50. The ink jet recording apparatus as claimed in claim 49, further comprising cleaning means for cleaning the nozzle surface of said ink jet head before the nozzle surface of said ink jet head is covered by said cap means and ink is sucked into said ink jet head by said suction means.

* * * * *